US009932011B2

(12) United States Patent
Hiraiwa et al.

(10) Patent No.: US 9,932,011 B2
(45) Date of Patent: Apr. 3, 2018

(54) SIDE AIRBAG APPARATUS

(71) Applicant: TOYODA GOSEI CO., LTD., Kiyosu-shi, Aichi-ken (JP)

(72) Inventors: Takuya Hiraiwa, Kiyosu (JP); Yuji Sato, Kiyosu (JP); Takashi Iida, Kiyosu (JP); Masashi Hotta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/368,731

(22) Filed: Dec. 5, 2016

(65) Prior Publication Data

US 2017/0182962 A1    Jun. 29, 2017

(30) Foreign Application Priority Data

Dec. 28, 2015 (JP) ................. 2015-255899
Apr. 4, 2016 (JP) ................. 2016-075303

(51) Int. Cl.
*B60R 21/207* (2006.01)
*B60R 21/231* (2011.01)
(Continued)

(52) U.S. Cl.
CPC ........... *B60R 21/207* (2013.01); *B60N 2/686* (2013.01); *B60R 21/235* (2013.01); *B60R 21/237* (2013.01); *B60R 21/2338* (2013.01); *B60R 21/2346* (2013.01); *B60R 21/23138* (2013.01); *B60R 21/262* (2013.01); *B60R 21/264* (2013.01); *B60R 2021/0006* (2013.01);
(Continued)

(58) Field of Classification Search
CPC ............ B60R 21/207; B60R 21/23138; B60R 2021/23146; B60R 2021/0006
See application file for complete search history.

(56) References Cited

U.S. PATENT DOCUMENTS 7,669,888 B2 * 3/2010 Sato ...................... B60R 21/207
                                                           280/730.2
8,596,675 B2 * 12/2013 Kwon ................... B60R 21/233
                                                           280/729

(Continued)

FOREIGN PATENT DOCUMENTS

JP    2009-023490 A    2/2009
JP    2009-023494 A    2/2009

*Primary Examiner* — Paul N Dickson
*Assistant Examiner* — Joselynn Y Sliteris
(74) *Attorney, Agent, or Firm* — Posz Law Group, PLC

(57) ABSTRACT

An airbag includes a main inflation portion, in which an inflator is arranged, and an auxiliary inflation portion, the volume of which is smaller than that of the main inflation portion. The main inflation portion is deployed forward in a space between an occupant and a side wall of the vehicle. Prior to the deployment of the main inflation portion outside the seat back, the auxiliary inflation portion is inflated inside the seat back with inflation gas from the inflator to push the occupant toward the inner side. The main inflation portion and the auxiliary inflation portion each have a communication port that connects the main inflation portion and the auxiliary inflation portion to each other. The airbag includes an inflation promoting structure, which promotes the inflation of the auxiliary inflation portion compared to the inflation of the main inflation portion.

7 Claims, 18 Drawing Sheets

(51) Int. Cl.
*B60R 21/2338* (2011.01)
*B60R 21/2346* (2011.01)
*B60R 21/262* (2011.01)
*B60R 21/237* (2006.01)
*B60R 21/235* (2006.01)
*B60R 21/264* (2006.01)
*B60N 2/68* (2006.01)
*B60R 21/00* (2006.01)

(52) U.S. Cl.
CPC ............... *B60R 2021/23146* (2013.01); *B60R 2021/23509* (2013.01); *B60R 2021/23514* (2013.01); *B60R 2021/23542* (2013.01); *B60R 2021/23576* (2013.01)

(56) References Cited

U.S. PATENT DOCUMENTS

| | | | |
|---|---|---|---|
| 2009/0020988 A1 | 1/2009 | Sato et al. | |
| 2017/0174174 A1* | 6/2017 | Ohno | B60R 21/239 |
| 2017/0225640 A1* | 8/2017 | Ohno | B60R 21/207 |

* cited by examiner

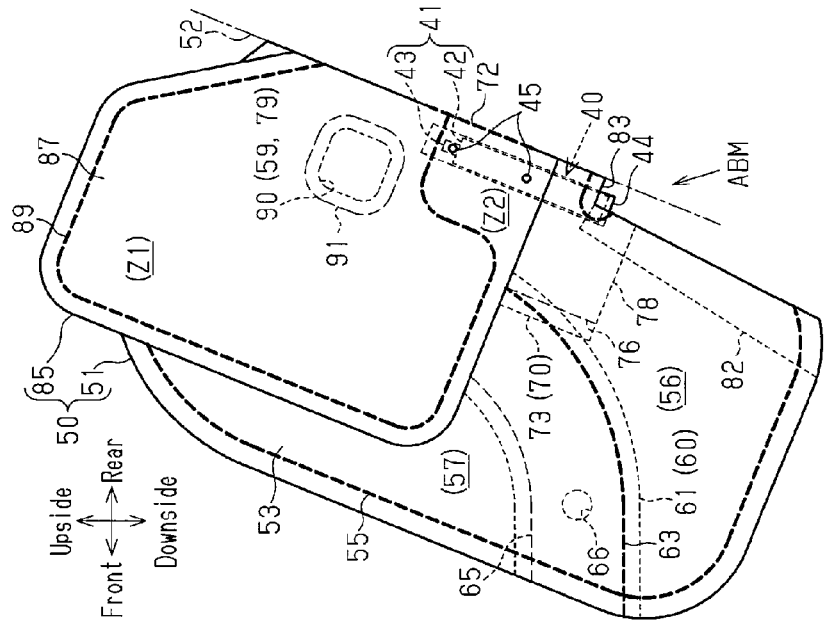
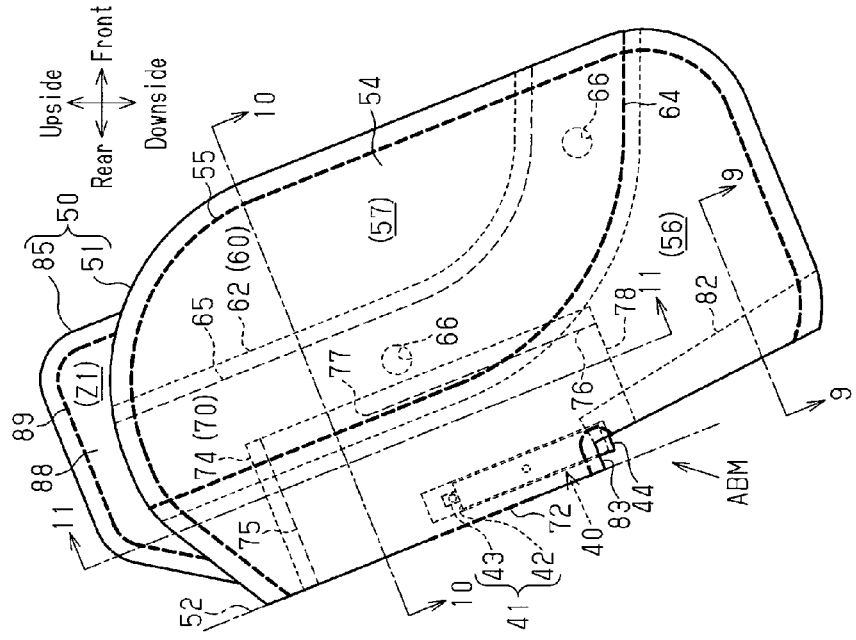

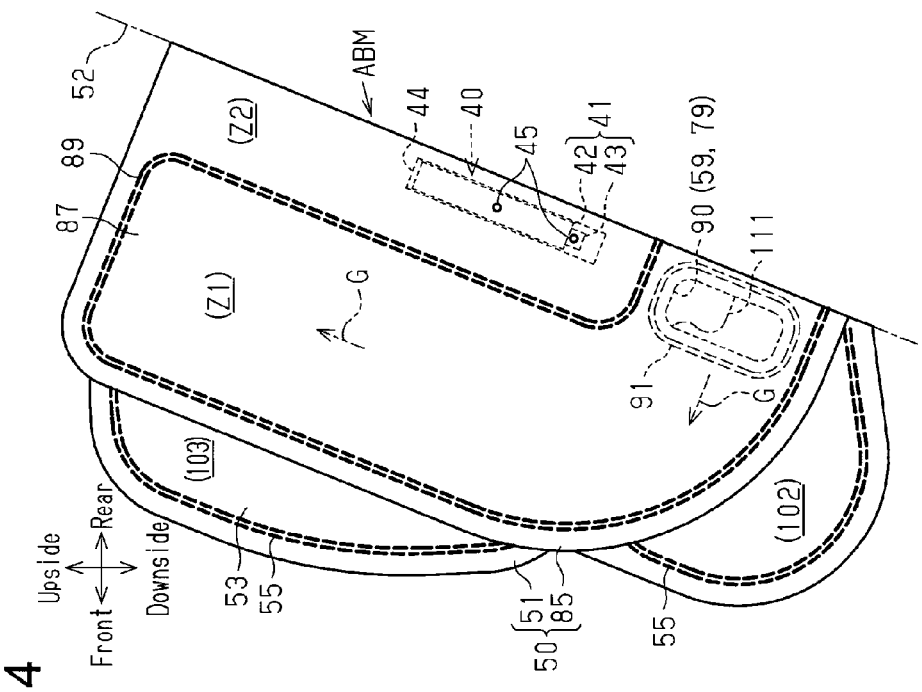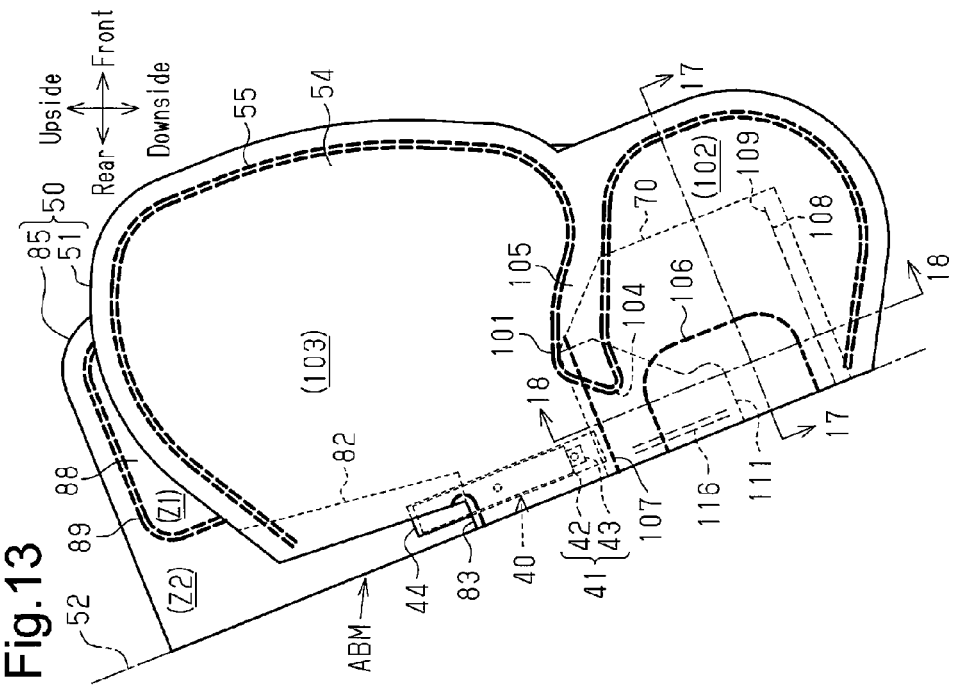

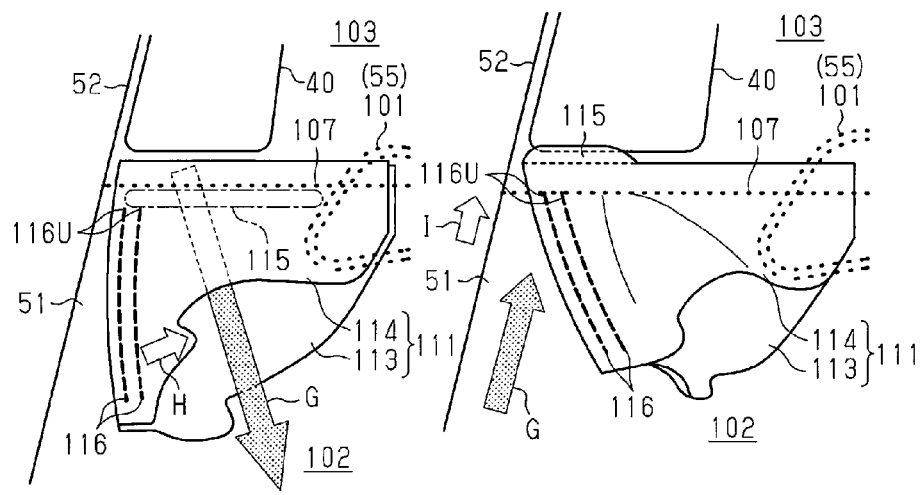
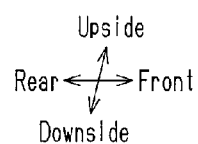
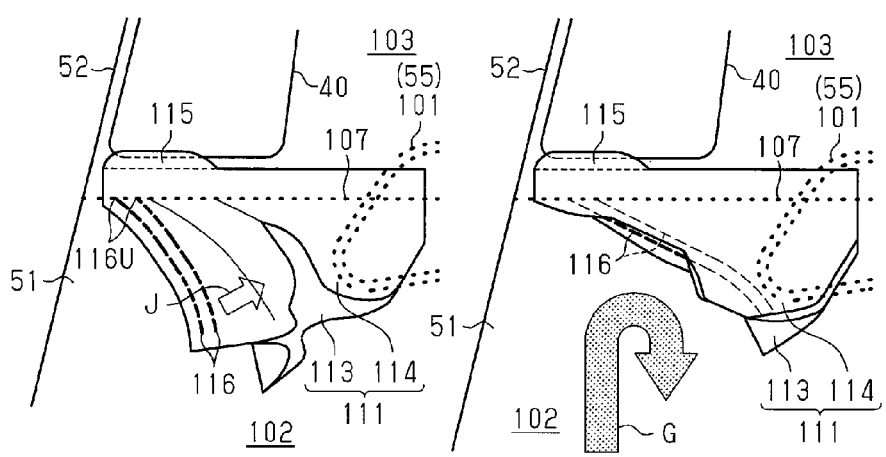

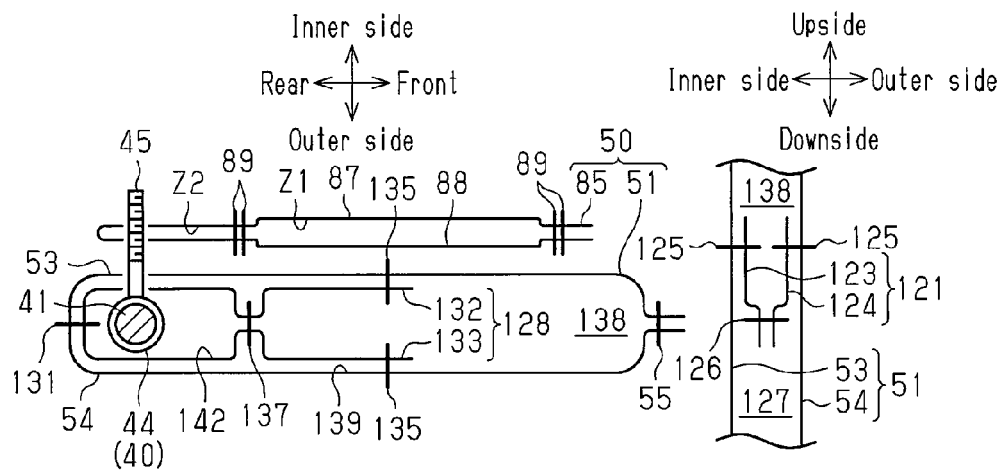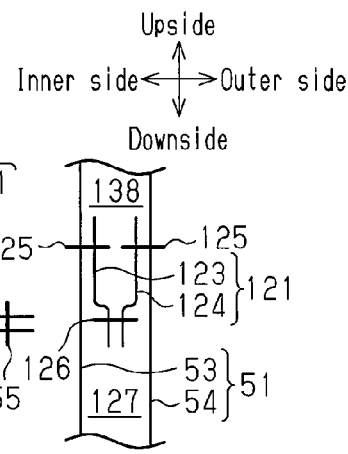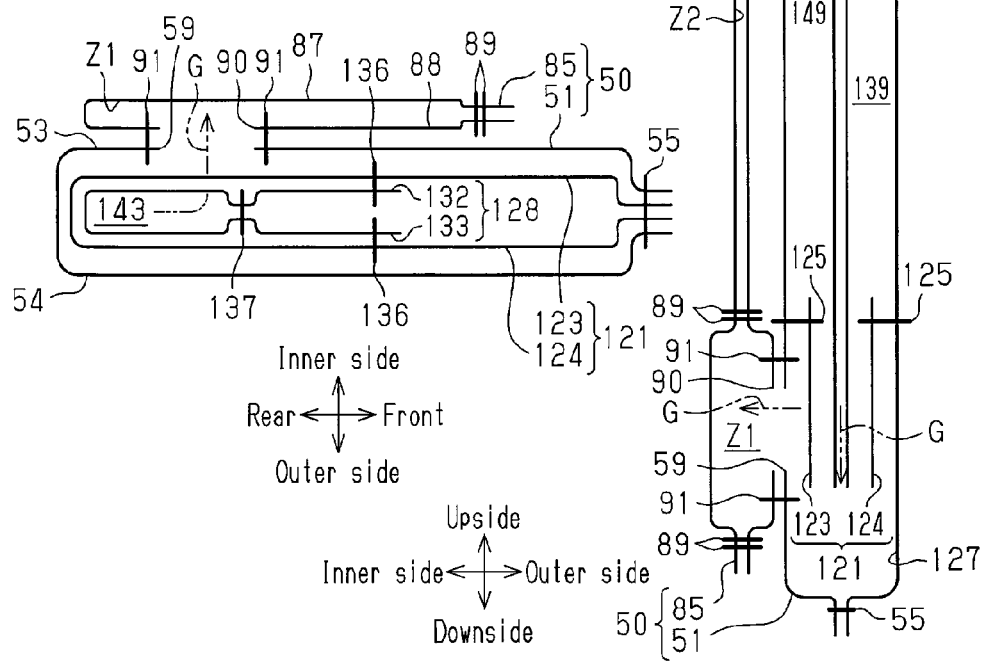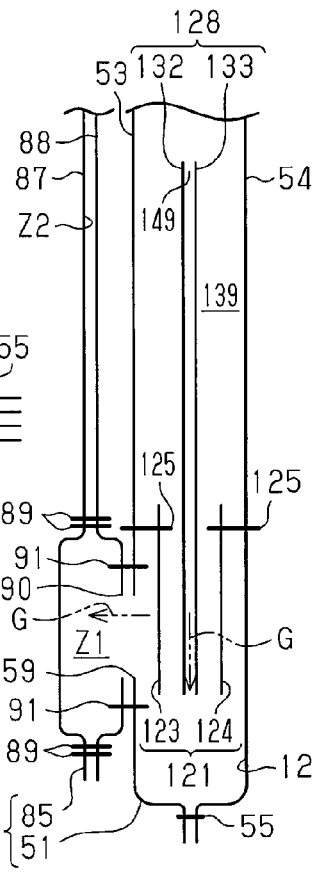

SIDE AIRBAG APPARATUS

BACKGROUND OF THE INVENTION

The present invention relates to a side airbag apparatus that protects an occupant seated in a vehicle seat with an airbag when an impact is applied to the vehicle from a side, for example, due to a side collision.

The side airbag apparatus is widely known as an apparatus that protects an occupant seated in a vehicle seat when an impact is applied to the seat from a side, for example, due to a side collision. A typical side airbag apparatus includes an inflator and an airbag, which is inflated with inflation gas supplied from the inflator. The inflator and the airbag are accommodated in the outer side of the seat back (backrest) of a vehicle seat.

One known form of the side airbag apparatus includes an airbag having a main inflation portion (a main airbag) and an auxiliary inflation portion (an auxiliary airbag) as disclosed in, for example, Japanese Laid-Open Patent Publications No. 2009-23490 and No. 2009-23494. The names of members inside the parentheses represent the names of members used in Japanese Laid-Open Patent Publications No. 2009-23490 and No. 2009-23494.

The main inflation portion is inflated with inflation gas supplied from the inflator and projects from the seat back to be deployed forward between the occupant and a side wall of the vehicle. Prior to the deployment of the main inflation portion outside the seat back, the auxiliary inflation portion is inflated inside the seat back with inflation gas from the inflator common to the main inflation portion to push the occupant toward the inner side. The main inflation portion and the auxiliary inflation portion communicate with each other via communication ports formed therein. In the above described side airbag apparatus, the inflator is arranged in the auxiliary inflation portion, which needs to be inflated preferentially.

In the above described side airbag apparatus, the auxiliary inflation portion is inflated preferentially before the main inflation portion is deployed forward outside the seat back. The auxiliary inflation portion moves the occupant seated in the vehicle seat toward the inner side to enlarge the space between the occupant and the side wall, thereby facilitating the forward deployment and inflation of the main inflation portion.

However, in side airbag apparatuses in which the airbag is constituted by a main inflation portion and an auxiliary inflation portion as described above, there is a tendency to reduce the volume of the auxiliary inflation portion. Accordingly, it is becoming difficult to place an inflator in the auxiliary inflation portion.

Also, although the auxiliary inflation portion enlarges the space between the occupant and the side wall, the main inflation portion is required to be inflated quickly to be properly deployed in the enlarged space. It is thus important for the inflator accommodated in the auxiliary inflation portion to supply inflation gas to the main inflation portion at an early stage, thereby quickly inflating the main inflation portion. Particularly, in the side airbag apparatuses disclosed in Japanese Laid-Open Patent Publications No. 2009-23490 and No. 2009-23494, the communication ports, which connect the main inflation portion and the auxiliary inflation portion with each other, are located at positions spaced apart from the gas outlet of the inflator. The inflation speed of the main inflation portion is therefore subject to further improvement.

SUMMARY OF THE INVENTION

Accordingly, it is an objective of the present invention to provide a side airbag apparatus that adds to the flexibility in arrangement of an inflator, quickly inflates a main inflation portion, and prioritizes inflation of an auxiliary inflation portion over that of the main inflation portion.

To achieve the foregoing objective and in accordance with one aspect of the present invention, a side airbag apparatus is provided that includes an airbag, which is configured to be stored in an outer side section of a seat back of a vehicle seat, and an inflator, which supplies inflation gas to the airbag. The airbag includes a main inflation portion and an auxiliary inflation portion. The main inflation portion is configured to be inflated with the inflation gas supplied from the inflator, project from the seat back, and be deployed forward in a space between a side wall of the vehicle and an occupant seated in a normal posture in the vehicle seat. The auxiliary inflation portion has a smaller volume than that of the main inflation portion. The auxiliary inflation portion is configured to be inflated in the seat back with the inflation gas from the inflator, thereby pushing the occupant toward an inner side of the vehicle prior to the inflation of the main inflation portion outside the seat back. The main inflation portion and the auxiliary inflation portion each have a communication port that connects the main inflation portion and the auxiliary inflation portion to each other. The inflator is arranged in the main inflation portion. The airbag includes an inflation promoting structure, which promotes inflation of the auxiliary inflation portion compared to inflation of the main inflation portion.

BRIEF DESCRIPTION OF THE DRAWINGS

FIG. 4 is a side view illustrating the airbag module according to the first embodiment, as viewed from the outer side of the vehicle, with the airbag in an uninflated-spread state.

FIG. 5 is a side view illustrating the airbag module according to the first embodiment, as viewed from the inner side of the vehicle, with the airbag in an uninflated-spread state.

FIG. 13 is a side view of a side airbag apparatus according to a second embodiment as viewed from the outer side of the vehicle, illustrating an airbag module with an airbag in an uninflated-spread state.

FIG. 14 is a side view illustrating the airbag module according to the second embodiment, as viewed from the inner side of the vehicle, with the airbag in an uninflated-spread state.

FIGS. 21A to 21D are schematic diagrams illustrating operation of the check valve shown in FIG. 20.

FIG. 26A is a cross-sectional view taken along line 26A-26A in FIG. 22.

FIG. 26B is a cross-sectional view taken along line 26B-26B in FIG. 22.

FIG. 26C is a cross-sectional view taken along line 26C-26C in FIG. 22.

FIG. 26D is a cross-sectional view taken along line 26D-26D in FIG. 22.

DETAILED DESCRIPTION OF THE PREFERRED EMBODIMENTS

First Embodiment

A side airbag apparatus according to a first embodiment will now be described with reference to FIGS. 1 to 12.

In the following description, the direction in which the vehicle advances forward will be referred to as the front, and the reverse direction will be referred to as the rear. The center of the width direction of the vehicle (the vehicle width direction) is used as a reference. A side closer to the center in the vehicle width direction will be referred to as "inner side" of the vehicle, while a side farther from the center in the vehicle width direction will be referred to "outer side" of the vehicle. It is now assumed that an occupant having a size equivalent to a crash test dummy is seated in a normal posture in the vehicle seat. The crash test dummy is, for example, the AM50 (the model that covers 50% of the American adult male population) of the WorldSID program.

Figure 1:
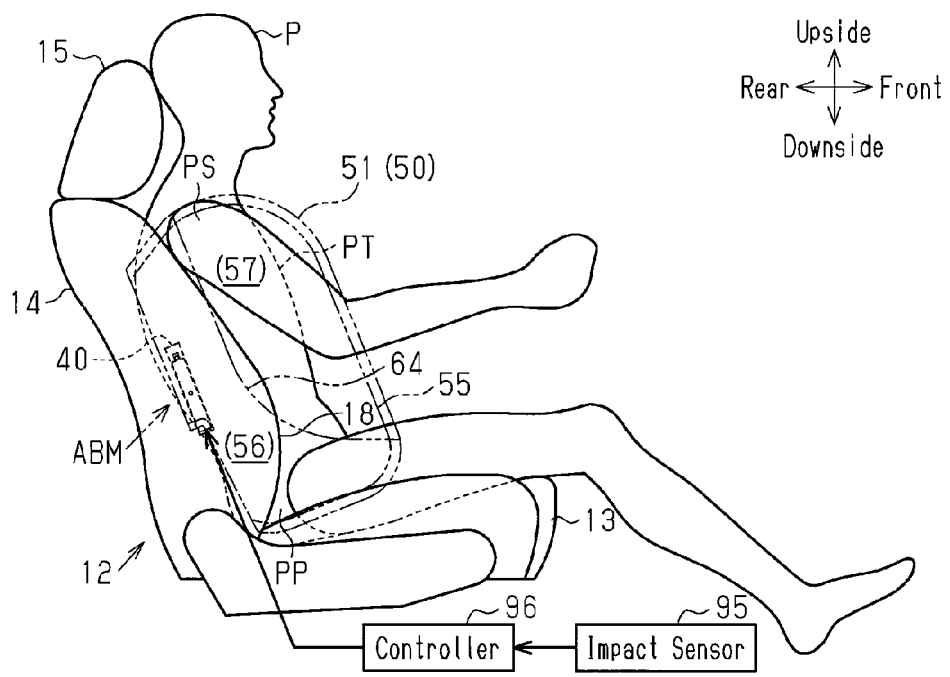
FIG. 1 is a side view of a side airbag apparatus according to a first embodiment, illustrating, together with an occupant, a vehicle seat in which the apparatus is installed.
Figure 2:
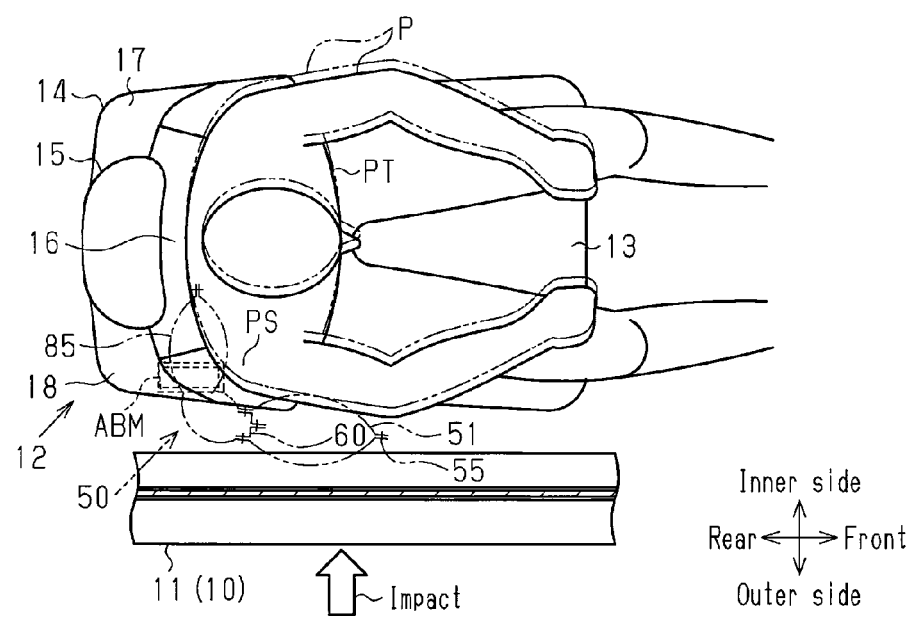
FIG. 2 is a cross-sectional plan view of the positional relationship of the vehicle seat, the airbag, the occupant, and a side wall according to the first embodiment.

As shown in FIGS. 1 and 2, a vehicle seat 12 is arranged on the inner side of a side wall 11 of a vehicle 10. The side wall 11 refers to a vehicle component that is located on a side of the vehicle 10, and mainly corresponds to a door and a pillar. For example, a part of the side wall 11 that corresponds to a front seat includes a front door and a center pillar (B-pillar). A part of the side wall 11 that corresponds to the rear seat includes a rear part of a side door (a rear door), a C-pillar, a front part of a wheel well, and a rear quarter.

The vehicle seat 12 includes a seat cushion 13, a seat back 14, which extends upward from the rear end of the seat cushion 13, and a headrest 15 attached to the top of the seat back 14. The tilt angle of the seat back 14 is adjustable. The vehicle seat 12 is arranged in the passenger compartment such that the seat back 14 faces forward. The width direction of the thus arranged vehicle seat 12 agrees with the direction of the vehicle width.

To distinguish sections in the vehicle width direction of the seat back 14, a middle part in the vehicle width direction will be referred to as a middle section 16, and parts on the sides in the vehicle width direction will be referred to as side sections 17, 18.

Figure 3:
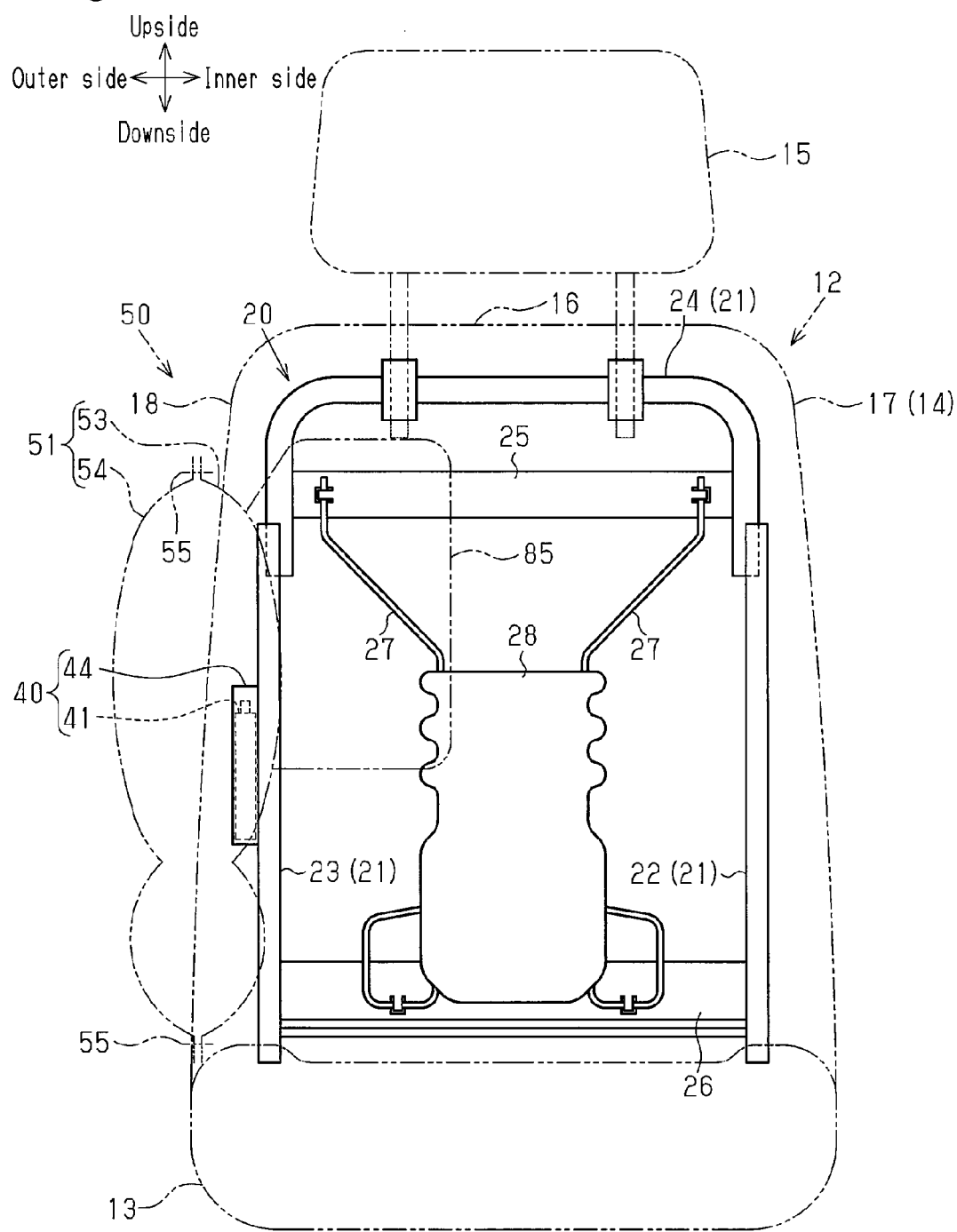
FIG. 3 is a front view of the seat frame according to the first embodiment as viewed from the front side of the vehicle.
Figure 12:
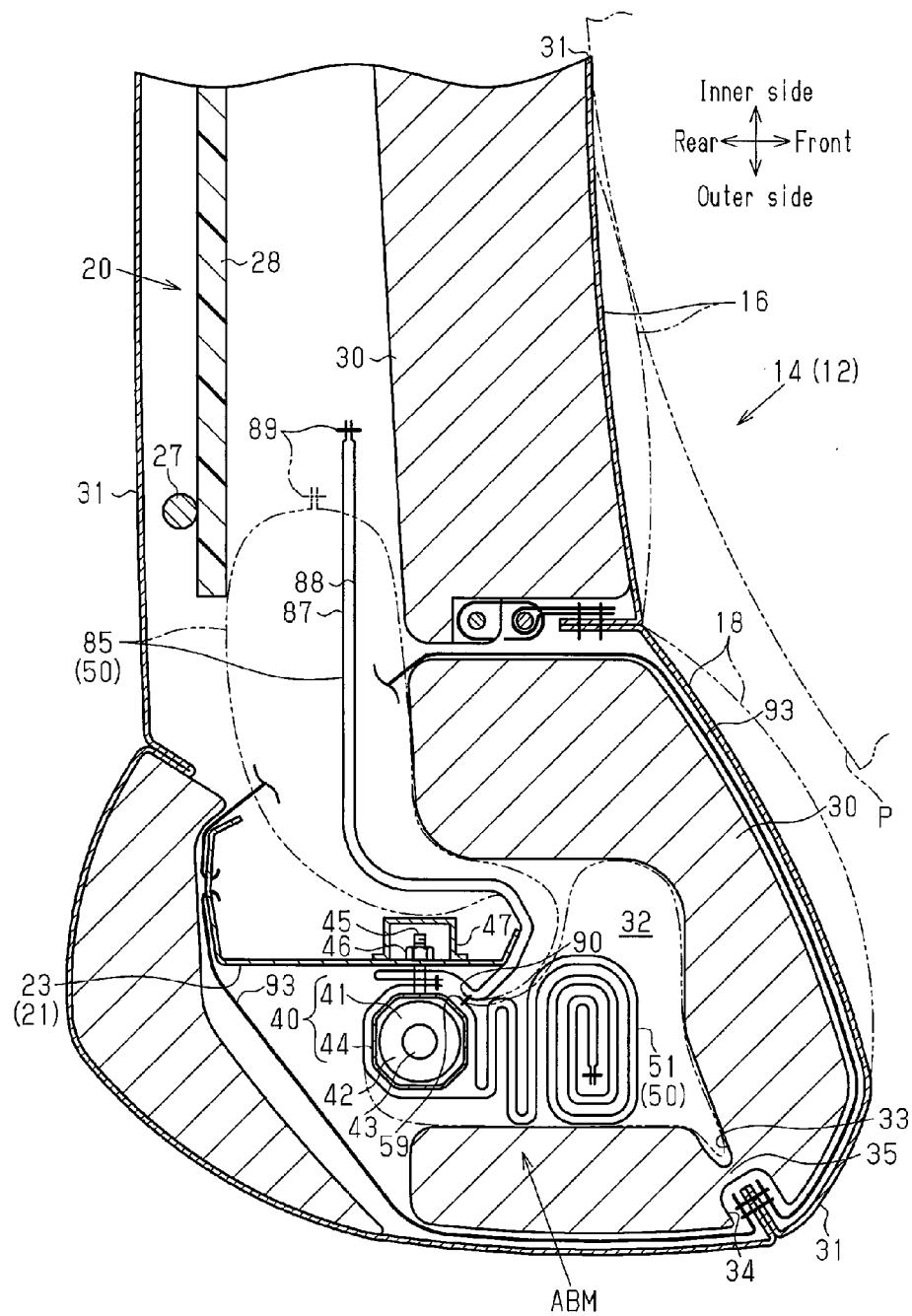
FIG. 12 is a cross-sectional plan view partially showing the internal structure of the seat back according to the first embodiment.

As shown in FIGS. 3 and 12, the framework of the seat back 14 is constituted by a seat frame 20. The periphery of the seat frame 20 is constituted by an outer frame portion 21. The outer frame portion 21 includes a pair of side frame portions 22, 23 and an upper frame portion 24. The side frame portions 22, 23 are formed by bending metal plates into shapes extending vertically and respectively arranged in the side sections 17, 18. The upper frame portion 24 is formed by bending a pipe into an inverted U. The opposite ends of the upper frame portion 24 face each other in the vehicle width direction and are respectively fixed to the upper ends of the side frame portions 22, 23.

A plate-shaped upper auxiliary frame portion 25, which extends in the vehicle width direction, bridges the opposite ends of the upper frame portion 24. Also, a plate-shaped lower auxiliary frame portion 26, which extends in the vehicle width direction, bridges the lower sections of the side frame portions 22, 23. Rods 27, which are made of spring material, bridge the upper auxiliary frame portion 25 and the lower auxiliary frame portion 26. A pressure receiving plate 28 is attached to the rods 27 from the front side. The pressure receiving plate 28 is configured to support the back of an occupant P seated in the vehicle seat 12 in a stable manner.

As shown in FIG. 12, a seat pad 30 made of an elastic material such as urethane foam is arranged in the vicinity of the seat frame 20. The seat pad 30 is covered with a plurality of covering sheets 31. Adjacent covering sheets 31 are joined to each other through sewing.

A storage portion 32 is provided in part of an outer side section 18 about the side frame portion 23. An airbag module ABM is arranged in the storage portion 32. The airbag module ABM forms a main part of the side airbag apparatus.

A slit 33 extends from a front outer corner of the storage portion 32. Also, a groove 34 is provided in the front part of the side section 18. That is, the part between the slit 33 and the groove 34 serves as a thin breakable portion 35, which is broken by a main inflation portion 51 of an airbag 50, which will be discussed below.

The airbag module ABM includes as its main components a gas generator 40 and the airbag 50. Each of these components will now be described.

<Gas Generator 40>

Figure 8:
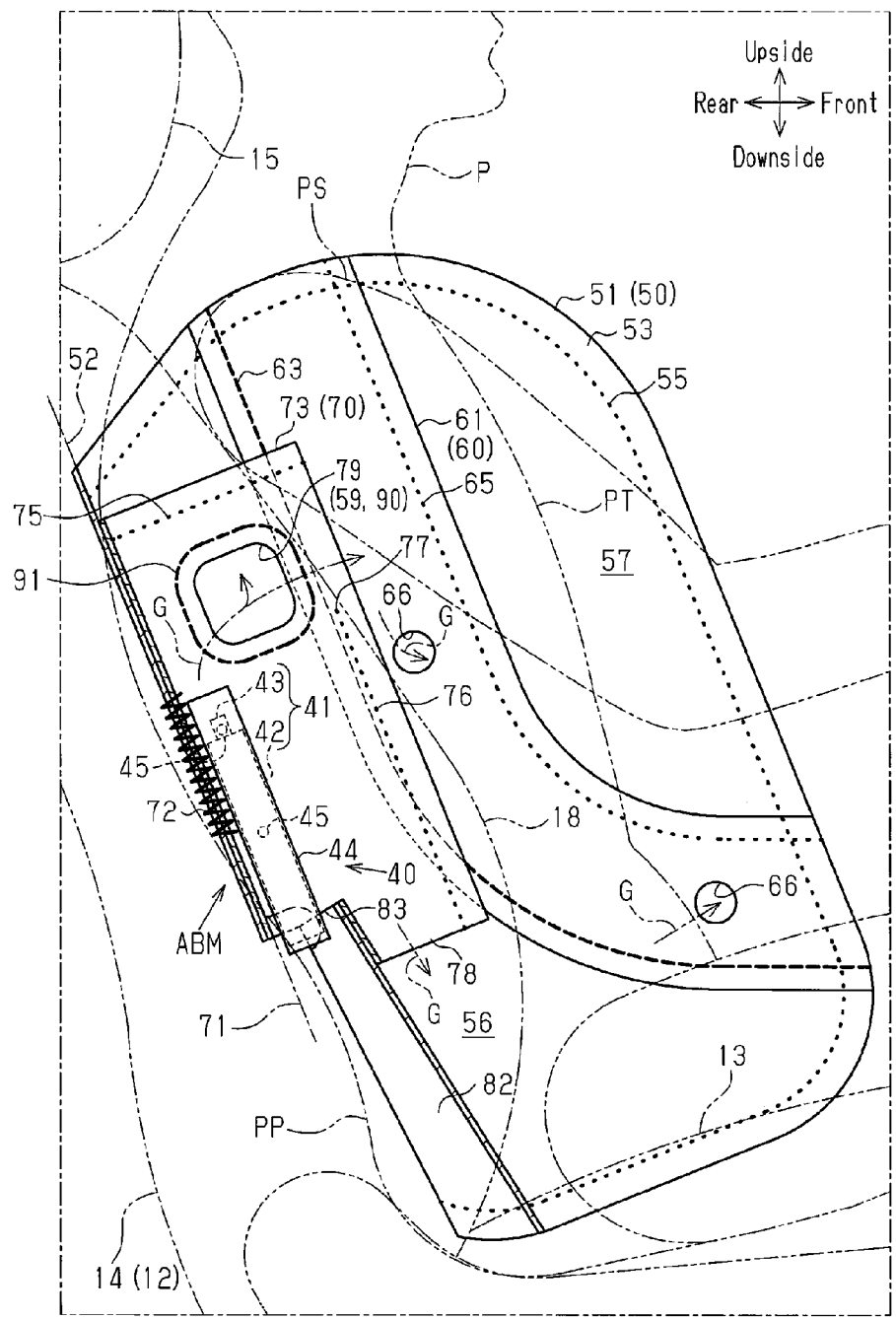
FIG. 8 is a cross-sectional side view illustrating, together with an occupant and a vehicle seat, the internal structure of the main inflation portion of the airbag module shown in FIG. 4.
Figure 9:
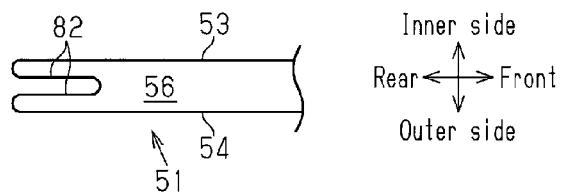
FIG. 9 is a cross-sectional view taken along line 9-9 in FIG. 4.

As shown in FIGS. 8 and 12, the gas generator 40 includes an inflator 41 and a retainer 44, which surrounds the inflator 41. In the present embodiment, a pyrotechnic type inflator is employed as the inflator 41. The inflator 41 includes an elongated main body 42 and a gas outlet 43 provided at the upper end of the main body 42. The gas outlet 43 has a columnar shape with a diameter smaller than that of the main body 42. The main body 42 stores a gas generating agent (not shown), which generates inflation gas. A harness (not shown) for delivering activation signals to the inflator 41 is connected to the lower end of the main body 42. The gas outlet 43 discharges inflation gas generated in the main body 42 in the radially outward direction.

In place of the pyrotechnic type inflator 41 using a gas generating agent, it is possible to use a hybrid type inflator, which discharges inflation gas by breaking a partition of a high-pressure gas cylinder filled with high-pressure gas with low explosive.

The retainer 44 functions as a diffuser for controlling directions of discharged inflation gas and also serves to fasten the inflator 41, together with the airbag 50, to the side frame portion 23. Most of the retainer 44 is formed by bending a plate such as a metal plate into a substantially cylindrical shape. The retainer 44 has a window (not shown) at a position facing the gas outlet 43. Some of the inflation gas discharged from the gas outlet 43 is supplied to the outside of the retainer 44 through the window.

A pair of bolts 45 is fixed to the retainer 44. The bolts 45 serve as securing members for attaching the retainer 44 to the side frame portion 23. The gas generator 40 may be formed by integrating the inflator 41 and the retainer 44.

As shown in FIGS. 2 and 3, the main part of the airbag 50 is constituted by the main inflation portion 51 and an auxiliary inflation portion 85, which has a smaller volume than that of the main inflation portion 51. The main inflation portion 51 is inflated with inflation gas to project from the seat back 14 and is deployed forward between the side wall 11 and the occupant P in the normal posture, who is leaning against the seat back 14. In contrast, the auxiliary inflation portion 85 is completely inflated prior to the main inflation portion 51. Specifically, prior to the deployment of the main inflation portion 51 outside the seat back 14, the auxiliary inflation portion 85 is inflated with inflation gas at a position forward of the pressure receiving plate 28 of the seat back 14 to push the upper body (mainly the shoulder region PS) of the occupant P toward the inner side.

Figure 6:
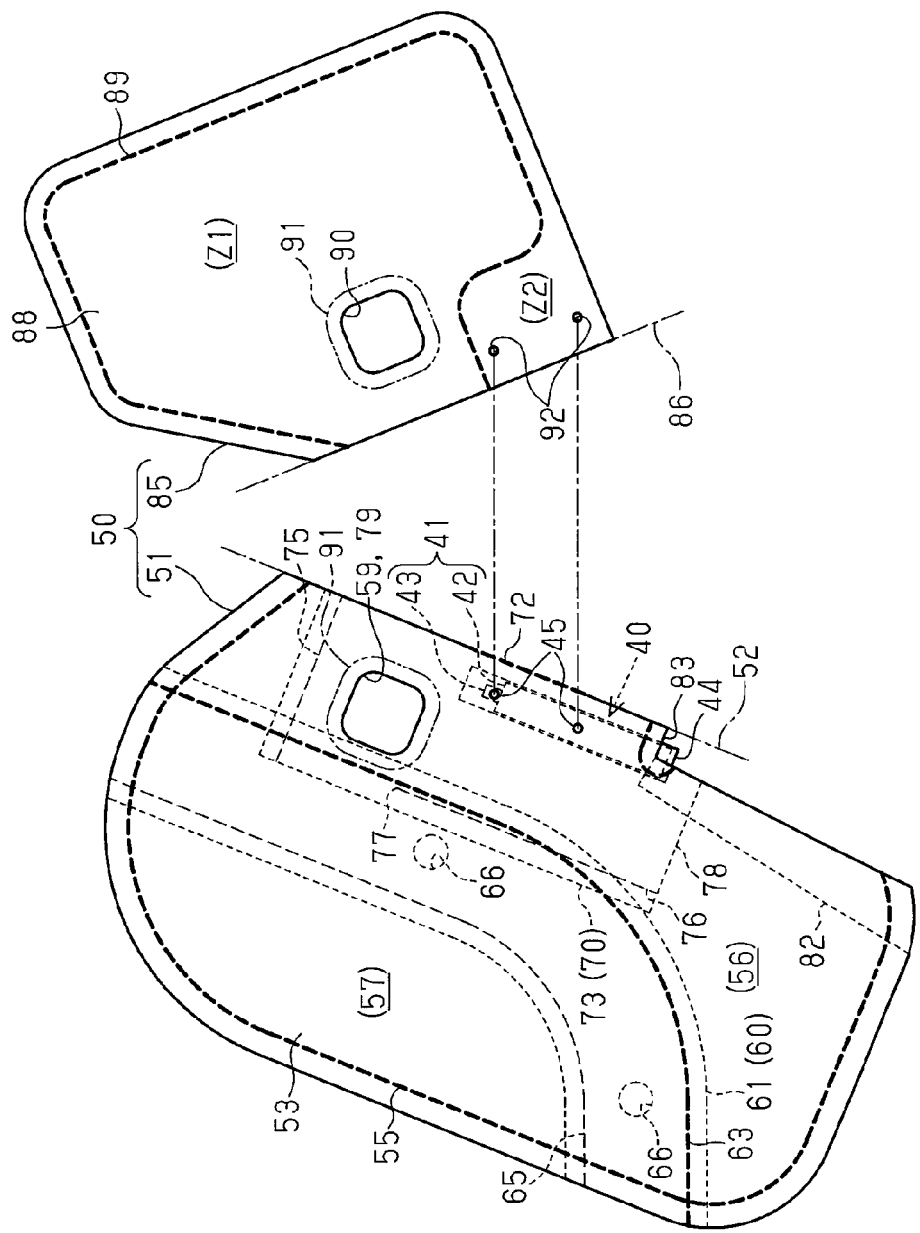
FIG. 6 is a side view illustrating the main inflation portion and the auxiliary inflation portion according to the first embodiment in a separated state.
Figure 7:
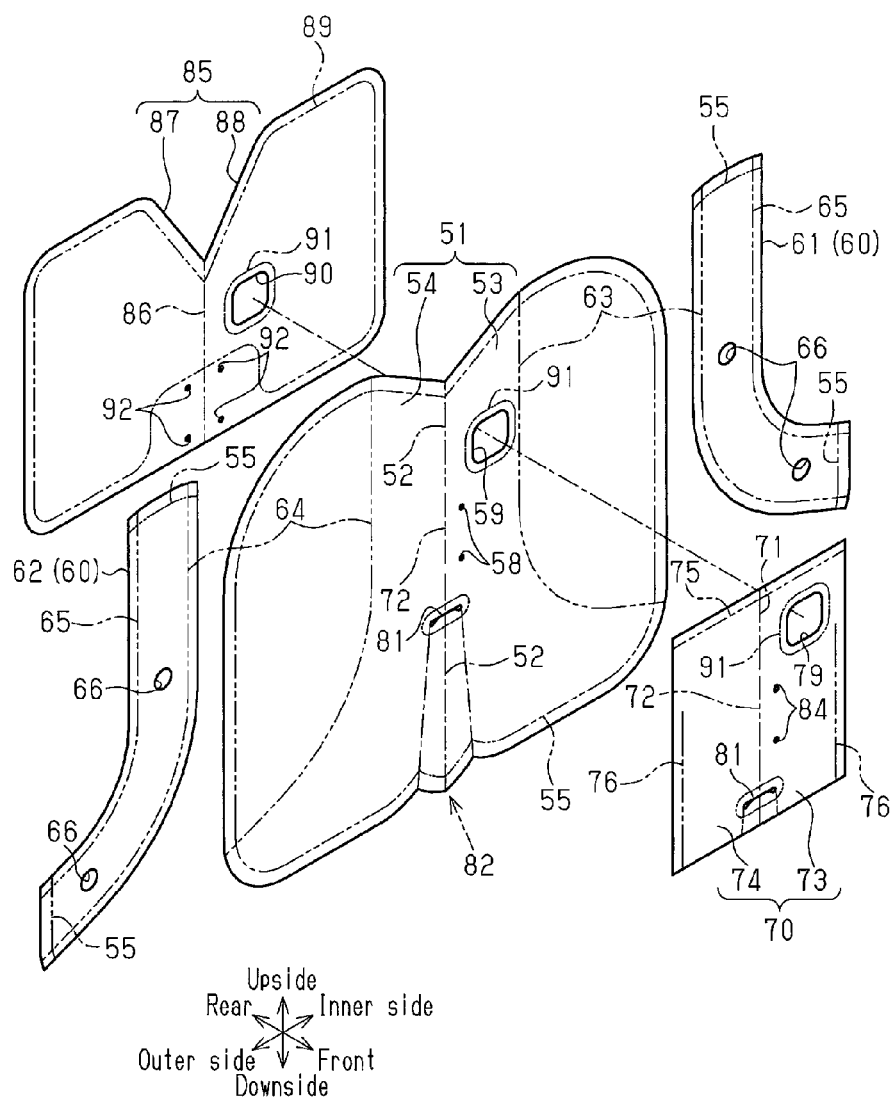
FIG. 7 is an exploded perspective view showing a flatly spread state of the components of the airbag according to the first embodiment.

FIGS. 4 to 6 show the main inflation portion 51 and the auxiliary inflation portion 85 in an uninflated-spread state, in which the inflation portions 51, 85 are flatly spread without being filled with inflation gas. FIG. 7 illustrates a flatly spread state of the components of the airbag 50. FIG. 8 illustrates, together with the vehicle seat 12 and the occupant P, the main inflation portion 51 cut at the center in the vehicle width direction. The auxiliary inflation portion 85 is not illustrated in FIG. 8.

<Main Inflation Portion 51>

As shown in FIGS. 4 and 6 to 8, the main inflation portion 51 is formed by a single fabric piece. Such a fabric piece is also referred to as a base fabric or a fabric panel. The fabric piece has a vertically extending folding line 52 at the center in the vehicle width direction. The fabric piece is folded in half along the folding line 52 to be superposed on itself in the vehicle width direction. To distinguish the two superposed parts of the main inflation portion 51, the part located on the inner side will be referred to as a fabric portion 53, and the part located on the outer side will be referred to as a fabric portion 54.

The shape and the size of the fabric portions 53, 54 are determined such that the main inflation portion 51 occupies the region beside most of the upper body of the occupant P (the part including the lumbar region PP and the shoulder region PS) when the main inflation portion 51 is deployed and inflated between the vehicle seat 12 and the side wall 11 (see FIG. 1).

In the first embodiment, the fabric piece is folded in half such that the folding line 52 is located at the rear end of the main inflation portion 51. However, the fabric piece may be folded in half such that the folding line 52 is located at another end such as the front end, the upper end, or the lower end of the main inflation portion 51. The main inflation portion 51 may also be formed of two fabric pieces divided along the folding line 52. Furthermore, the main inflation portion 51 may be formed of three or more fabric pieces.

The fabric piece is preferably formed of a material having high strength and flexibility to be easily folded. The material may be, for example, woven cloth formed of polyester threads or polyamide threads.

The fabric portions 53, 54, which are superposed on each other in the vehicle width direction, are joined to each other at a peripheral joint portion 55 provided at the peripheries. In the first embodiment, the peripheral joint portion 55 is formed by sewing parts of the peripheral portions of the fabric portions 53, 54 except for the rear end, more specifically, the part in the vicinity of the folding line 52. The space between the fabric portions 53 and 54 and surrounded by the peripheral joint portion 55 is part that is inflated with inflation gas.

Sewing is also performed on other joint portions, which will be discussed below. The joint portions include rear vertical joint portions 63, 64, a front vertical joint portion 65, a vertical joint portion 72, an upper lateral joint portion 75, a front vertical joint portion 76, a peripheral joint portion 89, and a loop-shaped joint portion 91. The same applies to a partition joint portion 101, a loop-shaped joint portion 106, an upper lateral joint portion 107, a lower lateral joint portion 108, and a rigid portion 116 in a second embodiment, which will be discussed below. Also, the same applies to a rear inclined joint portion 55a, an upper lateral joint portion 125, a lower lateral joint portion 126, a vertical joint portion 131, front vertical joint portions 135, 136, a rear vertical joint portion 137, and a front inclined joint portion 145 in a third embodiment.

Three different types of broken lines represent sewing portions in FIGS. 4 to 6 and 8. The first broken line includes thick line segments of a certain length arranged intermittently and represents sewing threads as viewed from the side (refer to the peripheral joint portion 55 in FIG. 4). The second broken line includes thin line segments of a certain length (longer than that of a typical broken line) arranged intermittently and represents the state of sewing threads that are located, for example, behind a fabric piece and cannot be seen directly (refer to the front vertical joint portion 65 in FIG. 4). The third broken line includes dots arranged at predetermined intervals and represents the cross-section of the sewing threads extending along the cross-section that passes through the sewn portions (refer to the peripheral joint portion 55 in FIG. 8).

The peripheral joint portion 55 may be formed by a method other than sewing using the sewing threads, but may be formed by, for example, using an adhesive. Such modification is applicable to any of the above described joint portions.

A partition 60 and an inner tube 70 are provided in the main inflation portion 51. The partition 60 has the same structure as a component generally referred to as a tether.

<Partition 60>

As shown in FIGS. 4 and 6 to 8, the partition 60 divides the main inflation portion 51 into two front and rear chambers, which are a front inflation chamber 57 and a rear inflation chamber 56. The partition 60 is formed by a pair of fabric portions 61, 62, which is made of the same material as that of the main inflation portion 51. The lower parts of the fabric portions 61, 62 are inclined rearward. When the main inflation portion 51 is in an uninflated-spread state, the fabric portions 61, 62 are superposed on each other in the vehicle width direction. The upper ends of the fabric portions 61, 62 are joined to the upper ends of the fabric portions 53, 54 of the main inflation portion 51 by part of the peripheral joint portion 55. The front lower ends of the fabric portions 61, 62 of the partition 60 are joined to the front lower parts of the fabric portions 53, 54 of the main inflation portion 51 by part of the peripheral joint portion 55.

Figure 10:
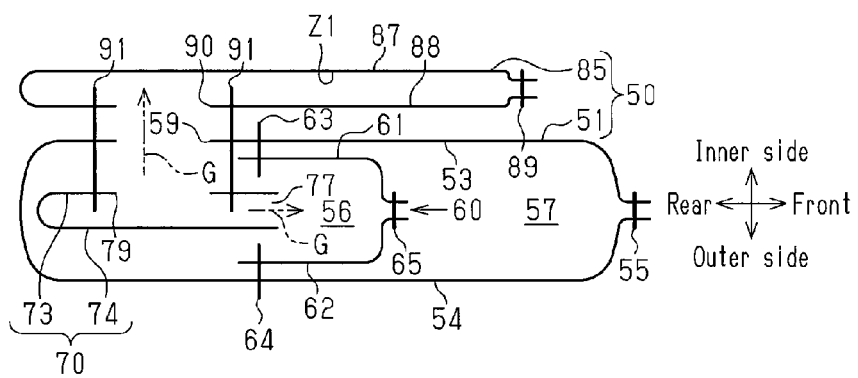
FIG. 10 is a cross-sectional view taken along line 10-10 in FIG. 4.

As shown in FIG. 10, the fabric portion 61 on the inner side has an inner rear vertical joint portion 63 provided along the rear periphery. The fabric portion 61 is joined to the inner fabric portion 53 of the main inflation portion 51 by the rear vertical joint portion 63. The fabric portion 62 on the outer side has a rear vertical joint portion 64 provided along the rear periphery. The outer fabric portion 62 is joined to the fabric portion 54 on the outer side by the rear vertical joint portion 64.

The fabric portions 61, 62 of the partition 60 are joined to each other at a front vertical joint portion 65 at the front peripheries (refer to FIG. 10). The partition 60 bridges the fabric portions 53, 54 of the main inflation portion 51 by the above described joining structure.

Part of the main inflation portion 51 that is rearward of the partition 60 forms the rear inflation chamber 56. The gas generator 40 is located at the rear end of the rear inflation chamber 56. The details will be discussed below. The rear inflation chamber 56 starts being supplied with inflation gas from the inflator 41 at timing earlier than that of the front inflation chamber 57 to be deployed and inflated mainly beside the rear half of the thorax region PT and the lumbar region PP in the upper body of the occupant P.

Part of the main inflation portion 51 that is forward of the partition 60 forms the front inflation chamber 57. The front inflation chamber 57 is supplied with inflation gas via the rear inflation chamber 56 and the partition 60 and is deployed and inflated beside the front half of the thorax region PT and the shoulder region PS in the upper body of the occupant P.

The partition 60 has openings 66. The openings 66 allow the rear inflation chamber 56 and the front inflation chamber 57, which are on the opposite sides of the partition 60, to communicate with each other. As shown in FIG. 7, the openings 66 of the first embodiment are formed by holes formed in each of the fabric portions 61, 62 of the partition 60. Since each fabric portion 61, 62 has a pair of holes, the partition 60 has four holes, or four openings 66.

One or more than two openings 66 may be formed in each of the fabric portions 61, 62. Alternatively, only one of the fabric portions 61, 62 may have openings 66.

<Inner Tube 70>

The inner tube 70 is arranged in the rear inflation chamber 56 to encompass most of the gas generator 40 except for the lower end. The part of the gas generator 40 that is encompassed by the inner tube 70 includes the gas outlet 43 of the inflator 41. The inner tube 70 has a function of regulating the flow of inflation gas from the gas outlet 43.

The inner tube 70 is formed by a single rectangular fabric piece made of the same material as the main inflation portion 51. The surface of the fabric piece may be coated with silicone resin.

The fabric piece has a vertically extending folding line 71 at the center in the vehicle width direction. The fabric piece is superposed on the main inflation portion 51 with the folding line 71 matched the folding line 52 of the main inflation portion 51 in a spread state. The fabric piece is joined to the main inflation portion 51 by the vertical joint portion 72, which is provided along the folding lines 71, 52. This determines the position of the inner tube 70 in relation to the main inflation portion 51.

The fabric piece is folded in half along the folding line 71 to be superposed on itself in the vehicle width direction. To distinguish the two superposed portions of the fabric piece, the part located on the inner side will be referred to as a fabric portion 73, and the part located on the outer side will be referred to as a fabric portion 74.

The fabric portions 73, 74, which are superposed on each other in the vehicle width direction, are joined to each other at the upper lateral joint portion 75 provided at the upper edges. In contrast, the lower edges of the fabric portions 73, 74 are not joined to each other. Further, the fabric portions 73, 74 are joined to each other by the front vertical joint portion 76 provided along the front edges. The front vertical joint portion 76 is not provided in front upper parts of the fabric portions 73, 74, so that the fabric portions 73, 74 are not joined to each other.

The above described joining structure forms the inner tube 70, which has a closed upper end, an open lower end, and an open front upper part and extends substantially vertically as a whole. The front upper open part and the open lower end of the inner tube 70 constitute gas supply ports 77, 78 respectively. The gas supply ports 77, 78 supply inflation gas discharged from the gas outlet 43 of the inflator 41 to the space outside the inner tube 70 in the rear inflation chamber 56.

As shown in FIG. 7, the main inflation portion 51 and the inner tube 70 each have a slit 81 at the rear end and the middle part in the vertical direction. The slits 81 extend in a direction orthogonal to the folding lines 52, 71. The parts of the fabric portions 53, 54 and the fabric portions 73, 74 that are below the slits 81 constitute an inward folding portion 82, which is folded into, or tucked into the remaining parts of the main inflation portion 51 and the inner tube 70 (see FIG. 9). The lower end of the inward folding portion 82 in the main inflation portion 51 is joined to the remaining parts of the fabric portions 53, 54 by part of the peripheral joint portion 55. When the inward folding portion 82 is formed, the slits 81 are opened to form an insertion port 83 for the gas generator 40. The fabric portions 53, 73 on the inner side respectively have bolt insertion holes 58, 84 above the slits 81 (the insertion port 83) to receive the two bolts 45 of the gas generator 40 (see FIG. 7).

The gas generator 40 is arranged to extend substantially vertically, and most of the gas generator 40 except for the lower end is inserted, through the insertion port 83, into the rear end of the inner tube 70, which is the rear end of the rear inflation chamber 56 in the main inflation portion 51. The lower end of the gas generator 40 is exposed to the outside of the main inflation portion 51. The bolts 45 of the gas generator 40 are inserted into the bolt insertion holes 84, 58, so that the gas generator 40 is secured to and positioned relative to the inner tube 70 and the main inflation portion 51.

<Auxiliary Inflation Portion 85>

As shown in FIGS. 4, 5, and 7, the auxiliary inflation portion 85 is formed by a single fabric piece made of the same material as the main inflation portion 51. The fabric piece has a vertically extending folding line 86 at the center in the vehicle width direction. The fabric piece is folded in half along the folding line 86 to be superposed on itself in the vehicle width direction. To distinguish the two superposed portions of the auxiliary inflation portion 85, the part located on the outer side and adjacent to the fabric portion 53 of the main inflation portion 51 will be referred to as a fabric portion 88, and the part located on the inner side and not adjacent to the fabric portion 53 of the main inflation portion 51 will be referred to as a fabric portion 87.

The shape and the size of the fabric portions 87, 88 are determined such that, when the auxiliary inflation portion 85 is inflated, the fabric portions 87, 88 are located at the height equivalent to the height of the shoulder region PS of the occupant P and push the shoulder region PS toward the inner side. The upper part of the auxiliary inflation portion 85 is inflated in the upper part of the seat back 14.

In the first embodiment, the fabric piece is folded in half such that the folding line 86 is located at the rear end of the auxiliary inflation portion 85. However, the fabric piece may be folded in half such that the folding line 86 is located at another end of the auxiliary inflation portion 85. The auxiliary inflation portion 85 may also be formed of two fabric pieces divided along the folding line 86. Furthermore, the auxiliary inflation portion 85 may be formed of three or more fabric pieces.

Figure 11:
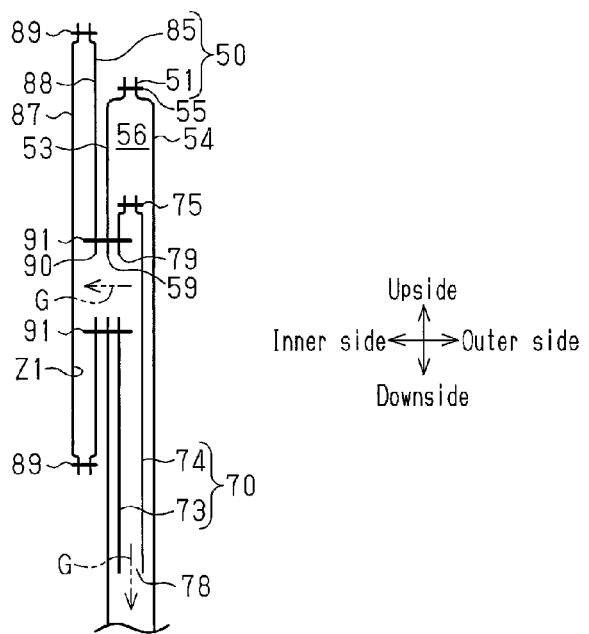
FIG. 11 is a cross-sectional view taken along line 11-11 in FIG. 4.

As shown in FIGS. 10 and 11, the fabric portions 87, 88, which are superposed on each other in the vehicle width direction, are joined to each other by the peripheral joint portion 89. As shown in FIGS. 5 and 6, most of the peripheral joint portion 89 is provided on the peripheries of the fabric portions 87, 88 except for the rear ends, more specifically, the parts in the vicinity of the folding line 86. Part of the peripheral joint portion 89 is curved to detour the rear lower parts of the fabric portions 87, 88. The region of the auxiliary inflation portion 85 that is surrounded by the peripheral joint portion 89 constitutes an inflation region Z1, which is inflated by being supplied with inflation gas. The region in the auxiliary inflation portion 85 that is not surrounded by the peripheral joint portion 89, that is, the region about the inflation region Z1, constitutes a non-inflation region Z2, which is neither supplied with inflation gas nor inflated. The non-inflation region Z2 includes the rear lower parts.

In the inflation region Z1 of the auxiliary inflation portion 85, no equivalents of the partition 60 and the inner tube 70, which are arranged in the main inflation portion 51, are provided. Also, the inflator 41 is not arranged in the inflation region Z1 of the auxiliary inflation portion 85.

The auxiliary inflation portion 85 in an uninflated-spread state is arranged such that at least part thereof is superposed on the main inflation portion 51 in an uninflated-spread state. In the first embodiment, the main part of the auxiliary inflation portion 85 is superposed on the upper part of the main inflation portion 51 as shown in FIG. 5. The main part of the auxiliary inflation portion 85 refers to most part of the auxiliary inflation portion 85 except for the upper end.

As shown in FIGS. 5, 6, and 7, the rear inflation chamber 56 of the main inflation portion 51, the inner tube 70, and the inflation region Z1 of the auxiliary inflation portion 85 respectively have communication ports 59, 79, 90 at positions that are in the vicinity of the gas outlet 43 of the inflator 41 and in which the inflation region Z1 is superposed on the main inflation portion 51. As shown in FIGS. 10 and 11, the main inflation portion 51, the inner tube 70, and the auxiliary inflation portion 85 are connected with one another via the communication ports 59, 79, 90. The communication ports 59, 79, 90 have a common opening area. The common opening area means that the opening areas are equal to or substantially equal to one another.

In the first embodiment, the inflator 41 is arranged such that the gas outlet 43, which is located above the main body 42, is located at a position where the auxiliary inflation portion 85 and the main inflation portion 51 are superposed on each other and between the main body 42 and the communication ports 59, 79, 90, so that the gas outlet 43 is located close to the communication ports 59, 79, 90.

Such arrangement of the inflator 41 constitutes part of an inflation promoting structure, which promotes inflation of the auxiliary inflation portion 85 compared to inflation of the main inflation portion 51.

In the first embodiment, the communication ports 59, 79, 90 are at a position where the distance from the gas outlet 43 to the communication ports 59, 79, 90 is shorter than the distance from the gas outlet 43 to either one of the gas supply ports 77, 78 of the inner tube 70. This structure constitutes part of the inflation promoting structure (see FIG. 8).

Further, in the first embodiment, the opening area of the communication ports 59, 79, 90 is set to be greater than the sum of the opening areas, that is, the total opening area of the openings 66 of the partition 60. This setting constitutes part of the inflation promoting structure. The opening area of the communication ports 59, 79, 90 refers to the opening area common to the communication ports 59, 79, 90, but not the total opening area.

As shown in FIGS. 8 and 10, the main inflation portion 51, the inner tube 70, and the auxiliary inflation portion 85 are joined to one another by only the loop-shaped joint portion 91 about the communication ports 59, 79, 90.

The fabric portions 87, 88 have bolt insertion holes 92 in rear lower parts in the non-inflation region Z2 to receive the two bolts 45 of the gas generator 40. The bolts 45 of the inflator 41, which are passed through the inner tube 70 and the main inflation portion 51, are received by the bolt insertion holes 92 of the fabric portions 87, 88 of the auxiliary inflation portion 85.

As shown in FIG. 12, the airbag module ABM, which includes the gas generator 40 and the airbag 50 as main components, is stored in the storage portion 32 in the outer side section 18 of the seat back 14.

The bolts 45 extend from the gas generator 40 and are passed through the inner tube 70, the main inflation portion 51, and the auxiliary inflation portion 85, and are inserted into the side frame portion 23 from the outer side. In FIG. 12, the inner tube 70 is not illustrated. Nuts 46 are threaded to the bolts 45 from the inner side to fix the gas generator 40 to the side frame portion 23 together with the rear inflation chamber 56 of the main inflation portion 51, the inner tube 70, and the non-inflation region Z2 of the auxiliary inflation portion 85.

The gas generator 40 may be fixed to the side frame portion 23 using members other than the bolts 45 and the nuts 46.

FIG. 12 illustrates a cover 47 that is attached to the side frame portion 23 from the inner side to cover the bolts 45 and the nuts 46, so that the auxiliary inflation portion 85 will not be damaged by the bolts 45.

As shown in FIG. 12, the main inflation portion 51 in an uninflated-spread state is either roll-folded or accordion-folded to be compact in the front-rear direction and the vertical direction and arranged in the storage portion 32. The roll-folding refers to a folding method in which one end of the main inflation portion 51 is set as a center and the remaining portion is wrapped about the center. The accordion-folding refers to a folding method in which the main inflation portion 51 is repeatedly folded by a constant width while alternating the folding direction.

In contrast, part of the auxiliary inflation portion 85 that is on the inner side of the part that is fixed to the side frame portion 23 on the outer side is arranged in front of the pressure receiving plate 28 in the seat back 14 in a spread state without being folded. More specifically, the auxiliary inflation portion 85 is fixed to the side frame portion 23 from the outer side. The auxiliary inflation portion 85 is routed to pass in front of the side frame portion 23 and to extend to the space on the inner side of the side frame portion 23. The auxiliary inflation portion 85 is then routed to pass between the cover 47 and the seat pad 30 to be arranged between the pressure receiving plate 28 and the seat pad 30. The upper part of the auxiliary inflation portion 85 is located in an upper part in the seat back 14. Between the pressure receiving plate 28 and the seat pad 30, the fabric portion 88 of the auxiliary inflation portion 85 is located in front of the fabric portion 87.

Further, as shown in FIG. 12, webbings 93 of a low extensibility material are provided between the covering sheets 31 and the seat pad 30 and wrapped about the side frame portion 23 on the outer side and the airbag module ABM. The webbings 93 are provided to promote deployment of the main inflation portion 51. That is, the webbings 93 are extended at an early stage of deployment and inflation of the main inflation portion 51, thereby restricting the main inflation portion 51 from being inflated in directions different from a predetermined deployment direction. Also, the webbings 93 restrain deformation of the seat pad 30 and extension of the covering sheets 31, thereby promoting breakage of the seat pad 30 at the breakable portion 35. In this manner, the webbings 93 assist the inflating main inflation portion 51 in breaking the outer side section 18.

The webbings 93 are vertically spaced apart from the inflation area of the auxiliary inflation portion 85. In the present embodiment, the webbings 93 are spaced apart downward from the inflation area of the auxiliary inflation portion 85. Thus, the webbings 93 are unlikely to contact the auxiliary inflation portion 85 and hinder the inflation of the auxiliary inflation portion 85. In other words, the webbings 93 are arranged at positions where the webbings 93 do not contact the auxiliary inflation portion 85 during inflation of the auxiliary inflation portion 85.

As shown in FIG. 1, the side airbag apparatus includes an impact sensor 95 and a controller 96 in addition to the above described airbag module ABM. The impact sensor 95 is formed by an acceleration sensor and the like. The impact sensor 95 is provided on the side wall 11 of the vehicle 10 shown in FIG. 2 or the like to detect an impact applied to the side wall 11 from the side. The controller 96 controls operation of the inflator 41 based on a detection signal from the impact sensor 95.

Furthermore, the vehicle 10 is equipped with a seat belt apparatus for restraining the occupant P seated in the vehicle seat 12. However, illustration of the seat belt apparatus is omitted in FIG. 1.

Operation and advantages of the side airbag apparatus according to the first embodiment, which is configured as described above, will now be described.

In the side airbag apparatus according to the first embodiment, the airbag 50 includes the main inflation portion 51 and the auxiliary inflation portion 85, the volume of which is smaller than that of the main inflation portion 51. The inflator 41 is arranged in the main inflation portion 51, which has a relatively large volume. Compared to a case in which the inflator 41 is arranged in the auxiliary inflation portion 85 of a smaller volume, the arrangement of the inflator 41 is facilitated. This adds to the flexibility in arrangement of the inflator 41.

As shown in FIGS. 1 and 2, when the impact sensor 95 detects that an impact of a magnitude greater than or equal to a predetermined value has been applied to the side wall 11 due to a side collision or the like when the vehicle 10 is traveling, the controller 96 outputs, based on the detection signal, an activation signal for activating the inflator 41 to the inflator 41. In response to the activation signal, the inflator 41 discharges inflation gas through the gas outlet 43. The discharged inflation gas G is first supplied to the inner tube 70, which surrounds the gas outlet 43, as shown in FIG. 8. The inflation gas G starts inflating part of the rear inflation chamber 56 of the main inflation portion 51 that is about the inner tube 70.

The flow of the inflation gas G supplied to the inner tube 70 is regulated by the inner tube 70. Such regulation of flow causes some of the inflation gas G to flow through the gas supply port 77 in the front upper part of the inner tube 70 (see FIG. 10) and the gas supply port 78 at the lower end (see FIG. 11) and to be supplied to part of the rear inflation chamber 56 outside the inner tube 70.

The supply of the inflation gas G through the two gas supply ports 77, 78 increases the internal pressure of the rear inflation chamber 56, so that the rear inflation chamber 56 starts being inflated. The inflation of the rear inflation chamber 56 pulls the fabric portions 61, 62 of the partition 60 toward the opposite sides in the vehicle width direction. The partition 60 in the tensioned state restricts the inflation of the rear inflation chamber 56 in the vehicle width direction (see FIGS. 2 and 3).

Also, some of the inflation gas G supplied to the rear inflation chamber 56 flows out to the front inflation chamber 57 through the openings 66 of the partition 60. The inflow of the inflation gas G causes the front inflation chamber 57 to start being inflated with a delay from the rear inflation chamber 56.

The rear inflation chamber 56 and the front inflation chamber 57 are inflated while being unfolded in the reverse order of that when these were folded. The main inflation portion 51, which is deployed and inflated in the above described manner, pushes the seat pad 30 of the seat back 14, so that the seat pad 30 is broken at the breakable portion 35 shown in FIG. 12. The main inflation portion 51 is projected forward from the seat back 14 through the broken portion with part of the main inflation portion 51 remaining in the storage portion 32 (see FIGS. 1 and 2).

On the other hand, as shown in FIGS. 10 and 11, some of the inflation gas G discharged into the inner tube 70 from the gas outlet 43 of the inflator 41 flows into the auxiliary inflation portion 85 from the communication port 79 of the inner tube 70 and through the communication port 59 of the main inflation portion 51 and the communication port 90 of the auxiliary inflation portion 85 in the order. The part of the inflation gas G that has flowed into the auxiliary inflation portion 85 causes the auxiliary inflation portion 85 to start being inflated in the seat back 14 at a position in front of the pressure receiving plate 28 toward the boundary between the middle section 16 and the outer side section 18. The upper part of the auxiliary inflation portion 85 is inflated in the upper part of the seat back 14.

At the inflation of the auxiliary inflation portion 85, the side frame portion 23 on the outer side, which has a high rigidity, functions as a pressure receiving portion to receive the pressure of the inflation gas G diffused in the auxiliary inflation portion 85. This produces reaction force acting toward the vicinity of the boundary of the seat back 14. The reaction force causes the auxiliary inflation portion 85 to be inflated toward the inner side and diagonally forward. The inflated auxiliary inflation portion 85 pushes part of the outer side section 18 close to the middle section 16 so that the part bulges toward the inner side and diagonally forward.

As described above, the inflation gas G supplied from the inflator 41 causes the main inflation portion 51 and the auxiliary inflation portion 85 to start being inflated in the order. The inflation of the auxiliary inflation portion 85 is promoted compared to the inflation of the main inflation portion 51 in the following manner.

(1) In the first embodiment, the main part of the auxiliary inflation portion 85 in an uninflated-spread state is superposed on the upper part of the main inflation portion 51 in an uninflated-spread state as shown in FIGS. 4 to 6. Thus, the communication ports 59, 79, 90 of the main inflation portion 51, the inner tube 70, and the auxiliary inflation portion 85, which are formed in the superposed portion, are located in an upper part of the airbag 50. In contrast, the inflator 41 is arranged such that the gas outlet 43 is located above the main body 42 and in the superposed portion. The gas outlet 43 is located close to the communication ports 59, 79, 90.

The distance from the gas outlet 43 to the communication ports 59, 79, 90 is shorter than that in a case in which the inflator 41 is arranged such that the gas outlet 43 is located below the main body 42.

Also, the distance from the gas outlet 43 to the communication ports 59, 79, 90 is shorter than that in a case in which the inflator 41 is arranged such that the gas outlet 43 is located at a position where the auxiliary inflation portion 85 and the main inflation portion 51 are not superposed.

In either of the above cases, the gas outlet 43 is located close to the communication ports 59, 79, 90, so that the inflation gas G discharged from the gas outlet 43 quickly reaches the auxiliary inflation portion 85 through the communication ports 59, 79, 90. As a result, the inflation of the auxiliary inflation portion 85 is promoted compared to the inflation of the main inflation portion 51.

(2) As shown in FIGS. 7 and 8, the main inflation portion 51, the inner tube 70, and the auxiliary inflation portion 85 are connected to one another by the communication ports 59, 79, 90. The inner tube 70 has the gas supply ports 77, 78, which supply the inflation gas G from the inflator 41 to the main inflation portion 51 (the rear inflation chamber 56). The communication ports 59, 79, 90 are formed at a position where the distance from the gas outlet 43 to the communication ports 59, 79, 90 is shorter than the distance from the gas outlet 43 to the gas supply ports 77, 78.

Thus, some of the inflation gas G discharged from the gas outlet 43 reaches the communication ports 59, 79, 90 before reaching the gas supply ports 77, 78. Some of the inflation gas G discharged from the gas outlet 43 reaches and is supplied to the auxiliary inflation portion 85 before reaching part of the rear inflation chamber 56 of the main inflation portion 51 that is outside the inner tube 70. As a result, the inflation of the auxiliary inflation portion 85 is promoted compared to the inflation of the main inflation portion 51.

(3) As shown in FIG. 8, the main inflation portion 51 includes the partition 60, which has the openings 66 and divides the main inflation portion 51 into the rear inflation chamber 56, which accommodates the inflator 41, and the front inflation chamber 57, which is adjacent to and in front of the rear inflation chamber 56. The rear inflation chamber 56 has the communication port 59. The common opening area of the communication ports 59, 79, 90 is set to be greater than the total opening area of the openings 66.

Thus, since the communication ports 59, 79, 90 and the openings 66 are formed to have the above relationship in terms of the opening areas, a greater amount of inflation gas G is supplied to the auxiliary inflation portion 85 through the communication ports 59, 79, 90 than to the front inflation chamber 57 through the openings 66. As a result, the inflation of the auxiliary inflation portion 85 is promoted compared to the inflation of the main inflation portion 51.

As shown in FIGS. 6 and 12, in the inflation region Z1, the auxiliary inflation portion 85 is joined to the main inflation portion 51 only by the loop-shaped joint portion 91 about the communication ports 59, 79, 90. The auxiliary inflation portion 85 is fixed to the side frame portion 23, which is a reinforcing member, in the non-inflation region Z2. Thus, the inflation of the inflation region Z1 in the auxiliary inflation portion 85 is not likely to be restricted by the main inflation portion 51 or the side frame portion 23. Therefore, the auxiliary inflation portion 85 is smoothly inflated from the position fixed to the side frame portion 23.

Also, if stored in a folded state, the auxiliary inflation portion 85 would be inflated while being unfolded. Some of the energy of the inflation gas G would be spent for unfolding, which would hinder smooth inflation. In contrast, the auxiliary inflation portion 85 of the first embodiment is stored in a spread state and thus does not need to be unfolded. This allows for smooth inflation.

Since the inflation of the auxiliary inflation portion 85 is promoted compared to the inflation of the main inflation portion 51, the seat pad 30 bulges toward the inner side and diagonally forward to push the back of the occupant P leaning against the seat back 14 toward the inner side and diagonally forward as indicated by the long dashed double-short dashed lines in FIG. 12 before the main inflation portion 51 is deployed forward outside the seat back 14. The occupant P is moved toward the inner side as indicated by the long dashed double-short dashed lines in FIG. 2. The direction of the movement is away from the side wall 11. The movement enlarges the space between the side wall 11 and the occupant P in the vehicle width direction. Particularly, since the shoulder region PS, which is the part of the upper body of the occupant P that is closest to the side wall 11, is pushed, the space between the side wall 11 and the occupant P is enlarged efficiently.

In contrast, the main inflation portion 51, which has projected forward from the seat back 14, continues being inflating thereafter. That is, the main inflation portion 51 is deployed and inflated outside the seat back 14, more specifically, in the space between the side wall 11 and the upper body of the occupant P.

At this time, as described above, the space between the side wall 11 and the upper body of the occupant P is enlarged in the vehicle width direction as the auxiliary inflation portion 85 moves the occupant P. Thus, compared to a case in which the auxiliary inflation portion 85 does not enlarge the space, the main inflation portion 51 is easily deployed and inflated between the upper body of the occupant P and the side wall 11, which is bulging into the passenger compartment.

The main inflation portion 51, which is deployed and inflated in the above described manner, restrains the upper body of the occupant P. That is, the deployed and inflated main inflation portion 51 is located between the upper body of the occupant P and the side wall 11, which bulges into the passenger compartment. The main inflation portion 51 mitigates the impact from the side transmitted to the occupant P via the side wall 11, thereby protecting the occupant P from the impact.

Second Embodiment

A side airbag apparatus according to a second embodiment will now be described with reference to FIGS. 13 to 21D.

A main inflation portion 51 according to the second embodiment has a configuration different from that of the first embodiment. Specifically, the second embodiment is the same as the first embodiment in that the main inflation portion 51 has two inflation chambers. However, unlike the first embodiment, in which the two inflation chambers are arranged in the front-rear direction, the two inflation chambers of the second embodiment are arranged vertically.

Also, the inflator 41 is arranged such that the gas outlet 43 is located below the main body 42. The auxiliary inflation portion 85 is larger than that of the first embodiment. Communication ports are provided in lower parts of the main inflation portion 51 and the auxiliary inflation portion 85. These differences will be mainly discussed below.

<Main Inflation Portion 51>

Figure 16:
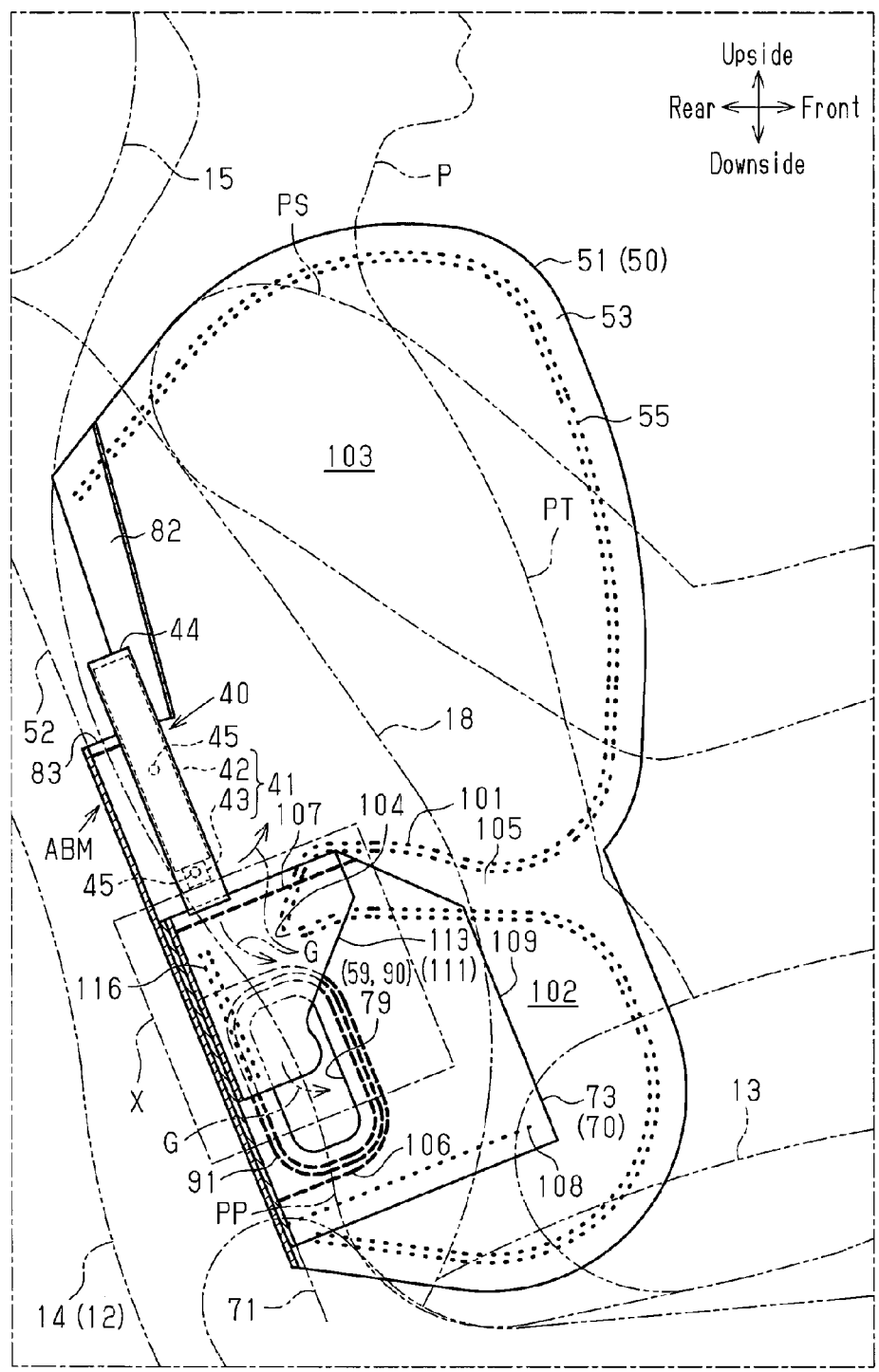
FIG. 16 is a cross-sectional side view illustrating, together with an occupant and a vehicle seat, the internal structure of the main inflation portion of the airbag module shown in FIG. 13.

As shown in FIGS. 13 and 16, the main inflation portion 51 has no member equivalent to the partition 60 of the first embodiment. Part of the peripheral joint portion 55 has the same function as the partition 60.

Part of the peripheral joint portion 55 is formed by a partition joint portion 101, which is located at a position different from the peripheries of the fabric portions 53, 54. The partition joint portion 101 is located at a position slightly lower than the center of the fabric portions 53, 54 in the vertical direction. The partition joint portion 101 extends rearward from the front end of the fabric portions 53, 54, which are superposed on each other in the vehicle width direction. At the position of the partition joint portion 101, the fabric portions 53, 54 are held in contact with and joined to each other.

A region in the main inflation portion 51 that is surrounded by the peripheral joint portion 55 is divided into a lower inflation chamber 102, which is located below the partition joint portion 101, and an upper inflation chamber 103, which is located above the partition joint portion 101. The main part of the lower inflation chamber 102 is deployed and inflated at a high internal pressure at a position directly above the seat cushion 13 and in the vicinity of the outer side of the lumbar region PP of the occupant P, thereby restraining and protecting the lumbar region PP. The upper inflation chamber 103 is deployed and inflated at an internal pressure lower than that of the lower inflation chamber 102 in the vicinity of the outer side of the thorax region PT of the occupant P to protect the thorax region PT and the like.

The rear end of the partition joint portion 101 is spaced apart forward from the folding line 52. The space in the main inflation portion 51 between the folding line 52 and the partition joint portion 101 constitutes a communication passage 104, which connects the lower inflation chamber 102 and the upper inflation chamber 103 to each other and functions as a passage for the inflation gas G.

Parts of the fabric portions 53, 54 that are surrounded by the partition joint portion 101 constitute a non-inflation portion 105, which is not inflated by the inflation gas G.

Figure 15:
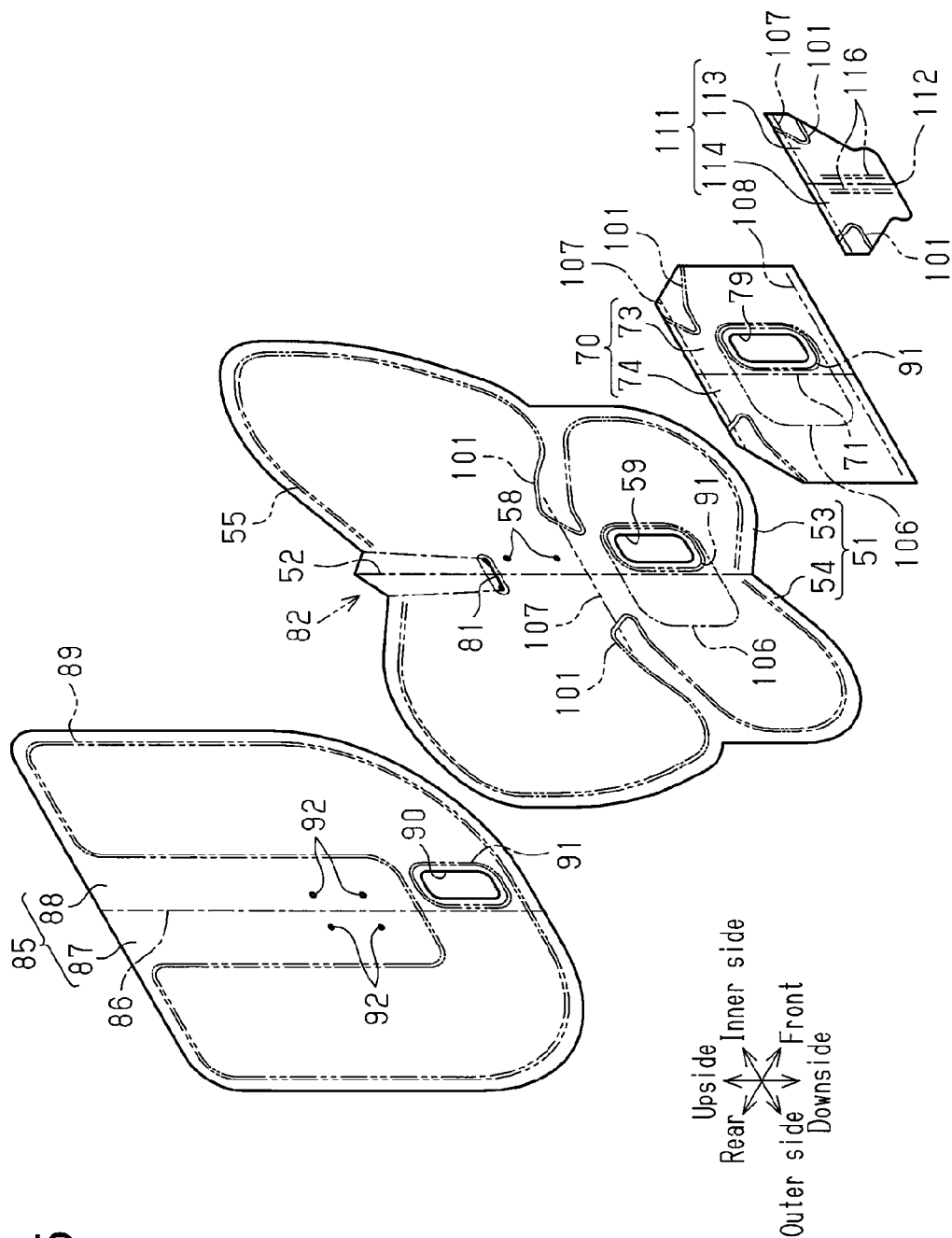
FIG. 15 is an exploded perspective view showing a flatly spread state of the components of the airbag according to the second embodiment.

As shown in FIGS. 13 and 15, the slit 81 is formed in upper parts of the rear ends of the fabric portions 53, 54, which are superposed on each other in the vehicle width direction. The inward folding portion 82 is located above the slit 81. The upper end of the inward folding portion 82 is joined to the remaining parts of the fabric portions 53, 54 by a part of the peripheral joint portion 55. When the inward folding portion 82 is formed, an insertion port 83 is formed. A pair of vertically arranged bolt insertion holes 58 is formed in the fabric portion 53 on the inner side at positions below the slit 81 (the insertion port 83).

Most of the gas generator 40 except for the upper end is inserted into the rear end of the upper inflation chamber 103 of the main inflation portion 51 through the insertion port 83. The upper end of the gas generator 40 is exposed to the outside of the main inflation portion 51. The lower end of the gas generator 40 is located between the folding line 52 and the partition joint portion 101. In the inflator 41, the gas outlet 43, which is below the main body 42, is located at a position in the upper inflation chamber 103 on the boundary with the lower inflation chamber 102. The bolts 45 of the gas generator 40 are inserted into the bolt insertion holes 58, so that the gas generator 40 is secured to and positioned relative to the main inflation portion 51.

The main inflation portion 51 has an inner tube 70 and a check valve 111.

<Inner Tube 70>

A fabric piece for forming the inner tube 70 has a folding line 71. The fabric piece is folded forward in half along the folding line 71 with the folding line 71 matched with the folding line 52 of the main inflation portion 51. In this state, the fabric piece is arranged between the fabric portions 53 and 54 of the main inflation portion 51.

The fabric piece is formed by two fabric portions 73, 74, which are joined to the corresponding fabric portions 53, 54 of the main inflation portion 51 by a loop-shaped joint portion 106 (see FIG. 17), which is located at the middle part in the vertical direction of the fabric portions 73, 74. The fabric portions 73, 74 are joined to the corresponding fabric portions 53, 54 of the main inflation portion 51 by a lateral joint portion 107, which is formed at the upper edges of the fabric portions 73, 74 to be orthogonal to the folding lines 71, 52 (see FIG. 18). The opposite ends of the upper lateral joint portion 107 intersect with the partition joint portion 101 and are located in the non-inflation portion 105. The loop-shaped joint portion 106 and the upper lateral joint portion 107 determine the position of the inner tube 70 in relation to the main inflation portion 51.

Figure 18:
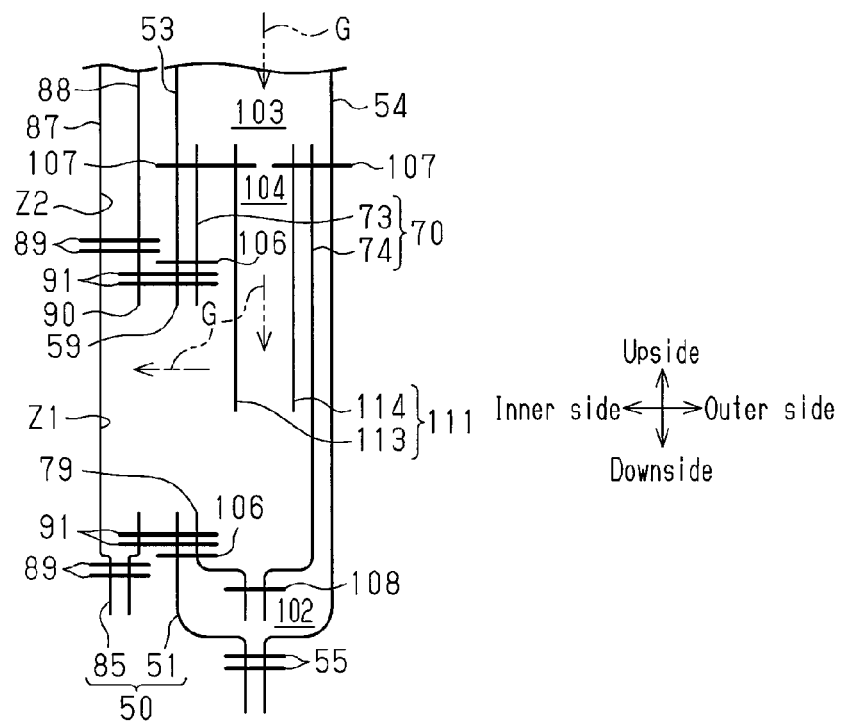
FIG. 18 is a cross-sectional view taken along line 18-18 in FIG. 13.

The fabric portions 73, 74, which are superposed on each other in the vehicle width direction, are joined to each other at a lower lateral joint portion 108 provided at the lower edges (see FIG. 18).

The front upper parts of the fabric portions 73, 74, which are superposed on each other in the vehicle width direction, are joined to the fabric portions 53, 54 of the main inflation portion 51 by the partition joint portion 101. Thus, the fabric portions 73, 74 are joined to each other also at the front upper parts. The fabric portions 73, 74 are not joined to each other at parts other than the front upper parts and the lower parts.

The above described joining structure forms the inner tube 70, which has a closed lower part, a closed front upper part, an open upper rear part, and an open front lower part. The open portion of the inner tube 70 at the front lower part constitutes a gas supply port 109, which supplies some of the inflation gas G discharged from the inflator 41, to part in the lower inflation chamber 102 that is outside the inner tube 70 (see FIG. 17).

<Check Valve 111>

As shown in FIGS. 15 and 16, the check valve 111 is configured to restrict the inflation gas G from flowing out to the upper inflation chamber 103 from the lower inflation chamber 102 and is formed by a fabric piece of the same material as the main inflation portion 51. The check valve 111 is located in the communication passage 104 and in the area in the vicinity of the communication passage 104. The fabric piece has a vertically extending folding line 112 at the center in the vehicle width direction (see FIG. 19). To distinguish two parts of the check valve 111 on the opposite sides of the folding line 112, the part on the inner side will be referred to as a valve member 113, and the part on the outer side will be referred to as a valve member 114. The check valve 111 is superposed on the inner tube 70 with the folding line 112 matched with the folding line 71 of the inner tube 70 and is arranged between the fabric portions 73 and 74 of the inner tube 70. The valve members 113, 114 are joined to the main inflation portion 51 together with the inner tube 70 by the upper lateral joint portion 107. The upper ends of the valve members 113, 114 are not joined to each other (see FIG. 18).

The front upper parts of the valve members 113, 114, which are superposed on each other in the vehicle width direction, are joined to the main inflation portion 51 and the inner tube 70 by the partition joint portion 101.

Figure 19:
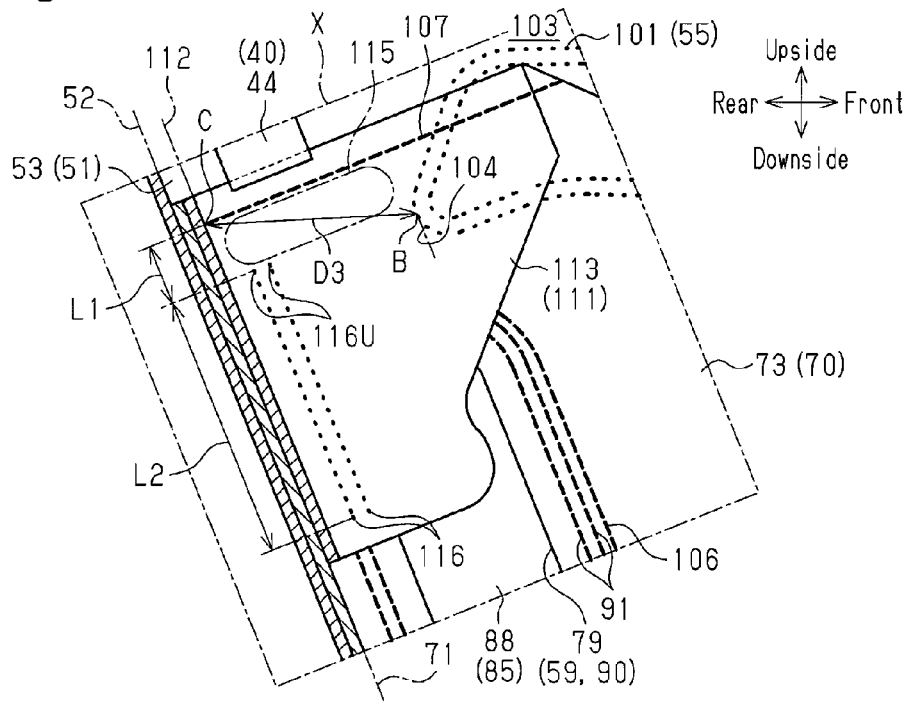
FIG. 19 is an enlarged partial cross-sectional side view illustrating section X in FIG. 16.

FIG. 19 illustrates section X of FIG. 16 in an enlarged manner. As shown in FIG. 19, in each of the valve members 113, 114, a region between the upper lateral joint portion 107 and a position that is spaced apart downward from the upper lateral joint portion 107 by a distance L1, that is, the region surrounded by a long dashed short dashed line in FIG. 19, forms a flexible portion 115. The flexible portion 115 is soft and easily warped toward the upper inflation chamber 103 by the pressure of the inflation gas G.

Further, the valve members 113, 114 have a rigid portion 116 at a position in front of and slightly spaced apart from the folding line 112. The rigid portion 116 is located in a rear part of the valve members 113, 114 and on the opposite side of the flexible portions 115 to the upper lateral joint portion 107. Specifically, the rigid portion 116 extends downward from a position below and spaced apart from the upper lateral joint portion 107 by a predetermined distance (the length L1). That is, the rigid portion 116 extends toward the lower inflation chamber 102. The rigid portion 116 is formed by sewing the valve members 113, 114 together by sewing threads such that one or more rows of seams. The rigid portion 116 is harder (greater in rigidity) and less flexible than the flexible portion 115 and the remaining parts of the check valve 111. In the present embodiment, the valve members 113, 114 are sewn together such that there are two rows of seams to form the rigid portion 116. The valve members 113, 114 are joined to each other by the rigid portion 116 at a position in front of and in the vicinity of the folding line 112.

Figure 20:
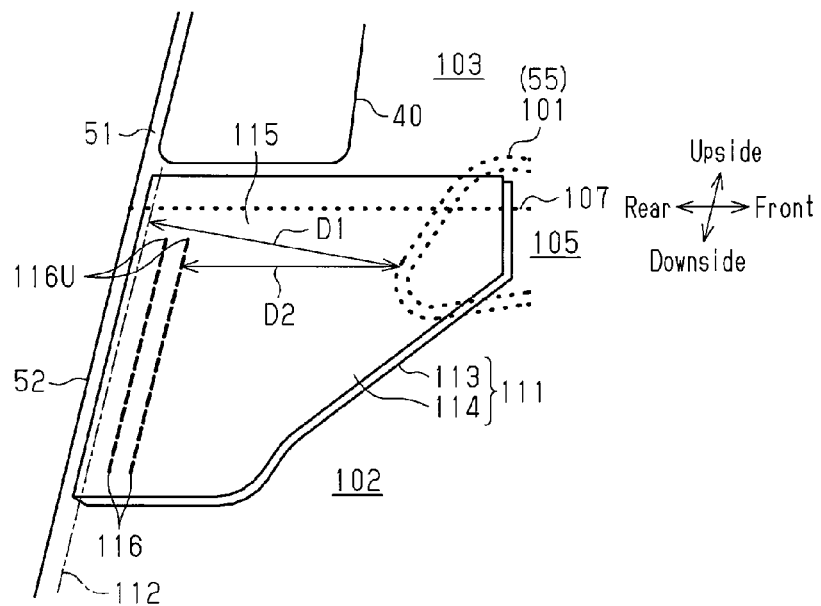
FIG. 20 is a schematic diagram showing the check valve according to the second embodiment before being supplied with inflation gas.

In the check valve 111, which has the above described configuration, the rigid portion 116 is spaced apart forward from the folding line 112 of the check valve 111 as shown in FIG. 20. Accordingly, in the flexible portion 115, the distance D1 between the folding line 112 and the partition joint portion 101 is longer than the distance D2 between the rigid portion 116 and the partition joint portion 101. This means that, when the inflation gas G flows between the valve members 113 and 114 to inflate the check valve 111, the regions between the rigid portion 116 and the partition joint portion 101 are inflated to each have a cylindrical shape of an inner diameter smaller than that of the flexible portions 115, which are regions between the folding line 112 and the partition joint portion 101.

Also, as shown in FIG. 19, the vertical length of the rigid portion 116 is defined as L2. The point in the partition joint portion 101 at which the distance from the rigid portion 116 is the shortest is defined as point B, and the point at which the upper lateral joint portion 107 intersects with the folding line 112 is defined as point C. The distance between point B and point C is defined as a distance D3. In the second embodiment, the length L2 and the distance D3 are set such that the expression L2>D3 is satisfied.

As described above, the upper ends of the valve members 113, 114 are joined to the corresponding fabric portions 53, 54 of the main inflation portion 51 and to the corresponding fabric portions 73, 74 of the inner tube 70 by the upper lateral joint portion 107. However, the upper ends of the valve members 113, 114 are not joined to each other (see FIG. 18). Thus, when supplied with the inflation gas G, the check valve 111 is inflated into a cylindrical shape with an open upper end and an open front lower part.

<Auxiliary Inflation Portion 85>

The auxiliary inflation portion 85 is configured to be inflated in the seat back 14 to push the occupant P toward the inner side. As shown in FIGS. 14 and 15, the auxiliary inflation portion 85 of the second embodiment is longer in the downward direction than that of the first embodiment. The main part of the auxiliary inflation portion 85 in an uninflated-spread state is arranged to be superposed on both of the lower inflation chamber 102 and the upper inflation chamber 103 of the main inflation portion 51 in an uninflated-spread state. The upper part of the auxiliary inflation portion 85 is inflated in the upper part of the seat back 14, and the lower part of the auxiliary inflation portion 85 is inflated in the lower part of the seat back 14.

In the auxiliary inflation portion 85, most of the peripheral joint portion 89, which joins the fabric portions 87, 88 to each other, is provided on the peripheries of the fabric portions 87, 88 except for the rear ends, specifically, in parts except for the parts in the vicinity of the folding line 86. Part of the peripheral joint portion 89 is curved to detour the upper part and the middle part in the vertical direction of the rear parts of the fabric portions 87, 88, which are superposed on each other in the vehicle width direction. In the auxiliary inflation portion 85, an inflation region Z1, which is surrounded by the peripheral joint portion 89, has a volume smaller than that of the main inflation portion 51. Also, in the auxiliary inflation portion 85, a non-inflation region Z2, which is not surrounded by the peripheral joint portion 89, includes the upper part and the middle part in the vertical direction.

Figure 17:
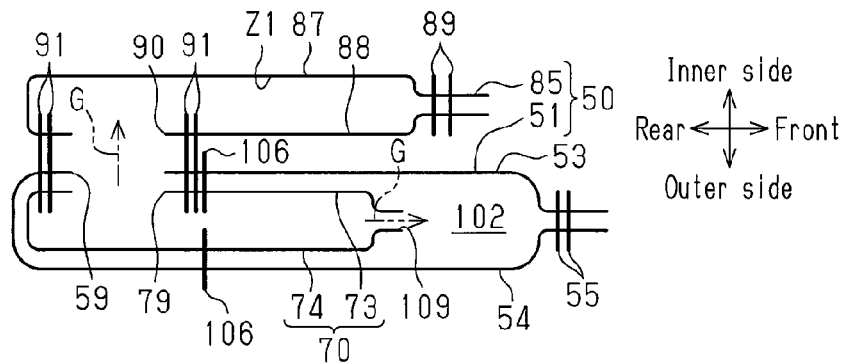
FIG. 17 is a cross-sectional view taken along line 17-17 in FIG. 13.

As shown in FIGS. 13 to 15, the lower inflation chamber 102 of the main inflation portion 51, the inner tube 70, and the inflation region Z1 of the auxiliary inflation portion 85 respectively have communication ports 59, 79, 90 at positions that are in the vicinity of the gas outlet 43 of the inflator 41 and in which the inflation region Z1 is superposed on the main inflation portion 51. Specifically, the communication ports 59, 79, 90 are holes that are located in a rear lower part of the inflation region Z1. As shown in FIGS. 17 and 18, the main inflation portion 51, the inner tube 70, and the auxiliary inflation portion 85 are connected with one another via the communication ports 59, 79, 90. The communication ports 59, 79, 90 have a common opening areas. The common opening area means that the opening areas are equal to or substantially equal to one another.

In the second embodiment, the inflator 41 is arranged such that the gas outlet 43 is located below the main body 42 and at a position in the upper inflation chamber 103 on the boundary with the lower inflation chamber 102. This arrangement allows the gas outlet 43 to be located at a position where the auxiliary inflation portion 85 and the main inflation portion 51 are superposed on each other and to be located between the communication ports 59, 79, 90 and the main body 42. Also, the gas outlet 43 is close to the communication ports 59, 79, 90. Such arrangement of the inflator 41 constitutes part of an inflation promoting structure, which promotes inflation of the auxiliary inflation portion 85 compared to inflation of the main inflation portion 51.

As shown in FIG. 16, in the second embodiment, the communication ports 59, 79, 90 are at a position where the distance from the gas outlet 43 to the communication ports 59, 79, 90 is shorter than the distance from the gas outlet 43 to the gas supply port 109 of the inner tube 70. This structure constitutes part of the inflation promoting structure.

The main inflation portion 51, the inner tube 70, and the auxiliary inflation portion 85 are joined to one another by only the loop-shaped joint portion 91 about the communication ports 59, 79, 90.

Each of the fabric portions 87, 88 has two vertically spaced bolt insertion holes 92 in an area above the communication port 90 in the non-inflation region Z2. The bolts 45 of the inflator 41, which are passed through the bolt insertion holes 58 of the main inflation portion 51, are received by the bolt insertion holes 92 of the fabric portions 87, 88 of the auxiliary inflation portion 85, which are superposed on each other in the vehicle width direction. The bolts 45 are inserted into the side frame portion 23 from the outer side. Nuts 46 are threaded to the bolts 45 to fix the gas generator 40 to the side frame portion 23 together with the upper inflation chamber 103 of the main inflation portion 51 and the non-inflation region Z2 of the auxiliary inflation portion 85.

Other than the above described differences, the second embodiment is the same as the first embodiment. Thus, like or the same reference numerals are given to those components that are like or the same as the corresponding components described above in the first embodiment and detailed explanations are omitted.

Operation and advantages of the side airbag apparatus according to the second embodiment, which is configured as described above, will now be described. Typical operation modes of the check valve 111 will now be described. FIGS. 20 to 21D schematically illustrate changes over time in the shape of the check valve 111 in response to supply and stopping of inflation gas G. Details are either omitted or simplified in the drawings.

The controller 96 outputs an activation signal in response to a side collision or the like to cause the inflator 41 to discharge inflation gas G from the gas outlet 43. As shown in FIG. 16, some of the inflation gas G flows toward the upper inflation chamber 103, and some of the inflation gas G flows toward the lower inflation chamber 102.

The gas outlet 43 is located at the lower end of the inflator 41. The main body 42 of the inflator 41, which is above the gas outlet 43, is formed to have a larger diameter than the gas outlet 43 and acts to hinder the upward flow of the inflation gas G. Thus, a greater amount of the inflation gas G flows in the check valve 111 toward the lower inflation chamber 102 than toward the upper inflation chamber 103.

While the inflation gas G from the inflator 41 is supplied to the check valve 111, the valve members 113, 114 of the check valve 111 receive force that acts to make the valve members 113, 114 into a cylindrical shape as shown in FIG. 21A. There are three factors in the generation of the force. One of the factors is that the upper ends of the valve members 113, 114 are joined to the main inflation portion 51 and the inner tube 70 by the upper lateral joint portion 107. Another factor is that the front upper parts of the valve members 113, 114 are joined to the main inflation portion 51 and the inner tube 70 by the partition joint portion 101. The other factor is that the valve members 113, 114 are joined to each other at the rear ends.

When the valve members 113, 114 are being made into a cylindrical shape, the flexible portions 115 and the section below the flexible portions 115 have different inner diameters (perimeters). As described above, in the check valve 111, the rigid portion 116 is space apart forward from the folding line 112. In the flexible portion 115, the distance D1 between the folding line 112 and the partition joint portion 101 is longer than the distance D2 between the rigid portion 116 and the partition joint portion 101 (see FIG. 20). Thus, parts of the valve members 113, 114 that are below the flexible portions 115 act to be inflated cylindrically with an inner diameter (perimeter) smaller than that of the flexible portions 115.

Although the front upper parts of the valve members 113, 114 are joined to the main inflation portion 51 and the inner tube 70, the rear ends of the valve members 113, 114 are merely joined to each other by the rigid portion 116, but not joined to the main inflation portion 51 or the inner tube 70. Although the front upper parts of the valve members 113, 114 are not movable relative to the fabric portions 53, 54 of the main inflation portion 51, the rear ends of the valve members 113, 114 are movable. Also, in the valve members 113, 114, the rigid portion 116 is rigid and hard to warp, but the flexible portion 115 is soft and easy to warp.

Therefore, the flexible portions 115 of the valve members 113, 114 act to inflate cylindrically with a large inner diameter (perimeter), and the part below the flexible portions 115 act to expand cylindrically with a small diameter (perimeter). This pulls and warps the flexible portions 115 toward the upper inflation chamber 103. Accordingly, the section in the valve members 113, 114 below the flexible portions 115 is pulled, while pivoting about a point in the rigid portion 116 close to the upper end 116U, toward the upper lateral joint portion 107 and toward the partition joint portion 101 as indicated by arrow H in FIG. 21A. That is, the section in the valve members 113, 114 below the flexible portions 115 is pulled upward and forward, while pivoting about a point in the rigid portion 116 close to the upper end 116U. This pulling action tilts the rigid portion 116 rearward. Also, the part between the partition joint portion 101 and the rigid portion 116, which is easily warped, is likely to be wrinkled.

As described above, the valve members 113, 114 are inflated to have a cylindrical shape, so that the parts of the inner tube 70 and the main inflation portion 51 about the check valve 111 are also inflated.

The inflation gas G, which has passed through the check valve 111 inflated into a cylindrical shape as described above, is supplied to the inner tube 70. As shown in FIG. 16, the flow of the inflation gas G is regulated by the inner tube 70. Some of the inflation gas G is supplied to part of the lower inflation chamber 102 outside the inner tube 70 via the gas supply port 109 in the front lower part of the inner tube 70.

The inflation gas G increases the internal pressure of the lower inflation chamber 102, so that the lower inflation chamber 102 starts being inflated. The continuous supply of the inflation gas G from the inflator 41 increases the internal pressure of the lower inflation chamber 102. The inflation gas G also increases the internal pressure of the upper inflation chamber 103. By being inflated, the upper inflation chamber 103 and the lower inflation chamber 102 are unfolded in the reverse order of that when these were folded.

The main inflation portion 51 pushes the seat pad 30 of the seat back 14, so that the seat pad 30 is broken at the breakable portion 35 (see FIG. 12). The main inflation portion 51 is projected forward from the seat back 14 through the broken portion with the rear part of the main inflation portion 51 remaining in the storage portion 32 (see FIGS. 1 and 2).

On the other hand, as shown in FIGS. 16 to 18, some of the inflation gas G supplied to the inner tube 70 flows into a lower part of the inflation region Z1 in the auxiliary inflation portion 85 from the communication port 79 of the inner tube 70 after flowing through the communication port 59 of the main inflation portion 51 and the communication port 90 of the auxiliary inflation portion 85 in the order. The inflation gas G flows upward in the inflation region Z1 as shown in FIG. 14. This flow of the inflation gas G causes the inflation region Z1 of the auxiliary inflation portion 85 to start being inflated in the seat back 14 at a position in front of the pressure receiving plate 28 toward the vicinity of the boundary between the middle section 16 and the outer side section 18. The auxiliary inflation portion 85 is inflated from the lower end toward the upper end in a wide region from the lower part to the upper part of the seat back 14. The upper part of the auxiliary inflation portion 85 is inflated in the upper part of the seat back 14.

At the inflation of the auxiliary inflation portion 85, the side frame portion 23 functions as a pressure receiving portion to generate reaction force, which inflates the auxiliary inflation portion 85 toward the inner side and diagonally forward. The inflated auxiliary inflation portion 85 pushes part of the outer side section 18 close to the middle section 16 so that the part bulges toward the inner side and diagonally forward.

As described above, the inflation gas G causes the main inflation portion 51 and the auxiliary inflation portion 85 to start inflating in the order. In the second embodiment also, the inflation of the auxiliary inflation portion 85 is promoted compared to the inflation of the main inflation portion 51 in the same manner as the first embodiment.

(1') As shown in FIGS. 13 to 15, the main part of the auxiliary inflation portion 85 (the inflation region Z1) in an uninflated-spread state is arranged to be superposed on the main inflation portion 51 in an uninflated-spread state. The communication ports 59, 90 are formed in the superposed parts. The communication port 59 of the main inflation portion 51 is located in the lower inflation chamber 102, and the communication ports 79, 90 of the inner tube 70 and the auxiliary inflation portion 85 are located at a position adjacent to the communication port 59 of the lower inflation chamber 102.

In contrast, the inflator 41 is arranged such that the gas outlet 43 is located below the main body 42 and at a position in the upper inflation chamber 103 on the boundary with the lower inflation chamber 102. In this arrangement, the gas outlet 43 is located between the communication ports 59, 79, 90 and the main body 42 and is close to the communication ports 59, 79, 90.

Thus, the distance from the gas outlet 43 to the communication ports 59, 79, 90 is shorter than that in a case in which the inflator 41 is arranged such that the gas outlet 43 is located above the main body 42.

Also, the distance from the gas outlet 43 to the communication ports 59, 79, 90 is shorter than that in a case in which the inflator 41 is arranged such that the gas outlet 43 is located at a position where the auxiliary inflation portion 85 and the main inflation portion 51 are not superposed on each other.

In either of the above cases, the gas outlet 43 is located close to the communication ports 59, 79, 90, so that some of the inflation gas G discharged from the gas outlet 43 reaches the auxiliary inflation portion 85 at an earlier stage through the communication ports 59, 79, 90. As a result, the inflation of the auxiliary inflation portion 85 is promoted compared to the inflation of the main inflation portion 51.

Further, as described above, the gas outlet 43 is located at a position in the upper inflation chamber 103 on the boundary with the lower inflation chamber 102. That is, the gas outlet 43 is closer to the communication ports 59, 79, 90 than that in a case in which the gas outlet 43 is located above the boundary. As a result, some of the inflation gas G discharged from the gas outlet 43 reaches the lower inflation chamber 102 at an earlier stage. Also, some of the inflation gas G discharged from the gas outlet 43 reaches the auxiliary inflation portion 85 through the communication ports 59, 79, 90 at an earlier stage. As a result, the inflation of the auxiliary inflation portion 85 is promoted compared to the inflation of the main inflation portion 51.

(2') The communication ports 59, 79, 90 are formed at a position where the distance from the gas outlet 43 of the inflator 41 to the communication ports 59, 79, 90 is shorter than the distance from the gas outlet 43 to the gas supply port 109 of the inner tube 70.

Thus, some of the inflation gas G discharged from the gas outlet 43 reaches the communication ports 59, 79, 90 before reaching the gas supply port 109. Some of the inflation gas G discharged from the gas outlet 43 reaches and is supplied to the auxiliary inflation portion 85 before reaching part of the lower inflation chamber 102 of the main inflation portion 51 that is outside the inner tube 70. As a result, the inflation of the auxiliary inflation portion 85 is promoted compared to the inflation of the main inflation portion 51.

Before the main inflation portion 51 is deployed forward outside the seat back 14, the seat pad 30 bulges toward the inner side and diagonally forward to push the back of the occupant P leaning against the seat back 14 toward the inner side and diagonally forward. Particularly, the shoulder region PS of the occupant P is pushed inward by the upper part of the auxiliary inflation portion 85, which is inflated in the upper part in the seat back 14.

When pushed in the above described manner, the occupant P is moved toward the inner side as indicated by the long dashed double-short dashed lines in FIG. 2. The movement enlarges the space between the side wall 11 and the occupant P in the vehicle width direction.

On the other hand, the main inflation portion 51, which has projected forward from the seat back 14, continues being inflating thereafter. That is, the main inflation portion 51 is deployed and inflated forward in the space between the side wall 11 and the upper body of the occupant P. At the deployment and inflation of the main inflation portion 51, the upper inflation chamber 103 is deployed and inflated between the side wall 11 and the occupant P seated in the vehicle seat 12, particularly between the side wall 11 and the region including the thorax region PT and the shoulder region PS. Also, the lower inflation chamber 102, the internal pressure of which has been increased by the inflation gas G, is deployed and inflated between the side wall 11 and the lumbar region PP of the occupant P.

At this time, as described above, the space between the side wall 11 and the occupant P is enlarged in the vehicle width direction as the auxiliary inflation portion 85 moves the occupant P. Thus, compared to a case in which the auxiliary inflation portion 85 does not enlarge the space, the main inflation portion 51 is easily deployed and inflated between the occupant P and the side wall 11, which is bulging into the passenger compartment.

The main inflation portion 51, which is deployed and inflated in the above described manner, restrains the upper body of the occupant P. That is, the deployed and inflated main inflation portion 51 is located between the upper body of the occupant P and the side wall 11, which bulges into the passenger compartment. The main inflation portion 51 mitigates the impact from the side transmitted to the occupant P via the side wall 11, thereby protecting the occupant P from the impact.

As discussed in the above advantage (1'), the gas outlet 43 is located at a position where the auxiliary inflation portion 85 and the main inflation portion 51 are superposed on each other and below the main body 42. The gas outlet 43 is also close to the communication ports 59, 79, 90. Accordingly, some of the inflation gas G discharged from the gas outlet 43 reaches part in the lower inflation chamber 102 outside the inner tube 70 at an early stage. The lower inflation chamber 102 is deployed and inflated beside the lumbar region PP of the occupant P seated in the seat cushion 13 at an early stage. This improves the performance for restraining the lumbar region PP at an early stage.

Further, the gas outlet 43 is located at a position in the upper inflation chamber 103 on the boundary with the lower inflation chamber 102, so that the gas outlet 43 is closer to the communication ports 59, 79, 90. Some of the inflation gas G discharged from the gas outlet 43 reaches the lower inflation chamber 102 at an earlier stage. This allows the lower inflation chamber 102 to be deployed and inflated beside the lumbar region PP at an earlier stage. This further improves the performance for restraining the lumbar region PP at an early stage.

When the inflator 41 stops discharging the inflation gas G, and the inflation gas G in the lower inflation chamber 102 acts to flow to the upper inflation chamber 103 as shown in FIG. 21B, the check valve 111 operates in the following manner. The flexible portions 115 are pulled toward the upper inflation chamber 103 and warped due to the difference in the inner diameters (the perimeters) and instantly receives the high pressure of the inflation gas G in the lower inflation chamber 102, which acts to flow toward the upper inflation chamber 103 substantially simultaneously with stopping of discharge of the inflation gas G. This pushes the flexible portions 115 toward the upper inflation chamber 103. Accordingly, the flexible portions 115 are pushed further upward as indicated by arrow I in FIG. 21B. This pulls the sections below the flexible portions 115 further forward and upward.

At this time, the rigid portion 116 is also pulled toward the upper lateral joint portion 107 as indicated by arrow J in FIG. 21C. The rigid portion 116 collapses forward and upward while maintaining the shape and pivoting about a point in the upper end 116U close to the upper lateral joint portion 107. At this time, like the flexible portions 115, parts of the valve members 113, 114 that are below the flexible portions 115 and in front of the rigid portion 116 receive the high pressure of the inflation gas G in the lower inflation chamber 102, which is flowing toward the upper inflation chamber 103. These pressure receiving parts are folded upward and diagonally forward to be squeezed into the space between the valve members 113 and 114. Accordingly, the space between the valve members 113 and 114, that is, the flow passage of the inflation gas G is reduced.

Since the length L2 of the rigid portion 116 is set to be longer than the distance D3 (L2>D3) as shown in FIG. 19, the rigid portion 116 contacts the partition joint portion 101 as shown in FIG. 21D, while collapsing upward and diagonally forward. The partition joint portion 101 restricts the rigid portion 116 from further collapsing forward and upward. At this stage, the check valve 111 is substantially closed, so that the inflation gas G in the lower inflation chamber 102 is restricted from flowing out to the upper inflation chamber 103 through between the valve members 113 and 114.

Therefore, the internal pressure of the lower inflation chamber 102, which has been increased to a level adequate for protecting the lumbar region PP of the occupant P, is restrained from being lowered due to outflow of the inflation gas G to the upper inflation chamber 103. The lumbar region PP, which has higher impact resistance than the remaining parts of the upper body of the occupant P, is protected by the lower inflation chamber 102 having a high internal pressure.

A typical operation mode of the side airbag apparatus has been described thus far. The check valve 111 may operate in a mode different from the one described above. In the different mode, the check valve 111 operates, part of the way, in the same manner as the above described typical mode. Specifically, the different mode is the same as the typical mode until the point when the flexible portions 115 are pulled upward and the rigid portion 116 is pulled forward and upward.

After the pulling actions, parts of the valve members 113, 114 below the flexible portions 115 are brought closer to each other by the high pressure of the inflation gas G in the lower inflation chamber 102 flowing toward the upper inflation chamber 103. These pressure receiving parts collapse toward the upper inflation chamber 103, while joining together from the side closer to the rigid portion 116, thereby closing the passage for the inflation gas G between the valve members 113 and 114.

In the second embodiment also, the inflator 41 is arranged in the main inflation portion 51, the volume of which is greater than that of the inflation region Z1 of the auxiliary inflation portion 85. Compared to a case in which the inflator 41 is arranged in the auxiliary inflation portion 85, the volume of which is small, the arrangement of the inflator 41 is facilitated. This adds to the flexibility in arrangement of the inflator 41.

Third Embodiment

A side airbag apparatus according to a third embodiment will now be described with reference to FIGS. 22 to 26D.

A main inflation portion 51 according to the third embodiment has a configuration different from that of the second embodiment. The third embodiment is different from the second embodiment in that the main inflation portion 51 has three inflation chambers, as opposed to two inflation chambers in the second embodiment. This difference will be mainly discussed below.

Figure 22:
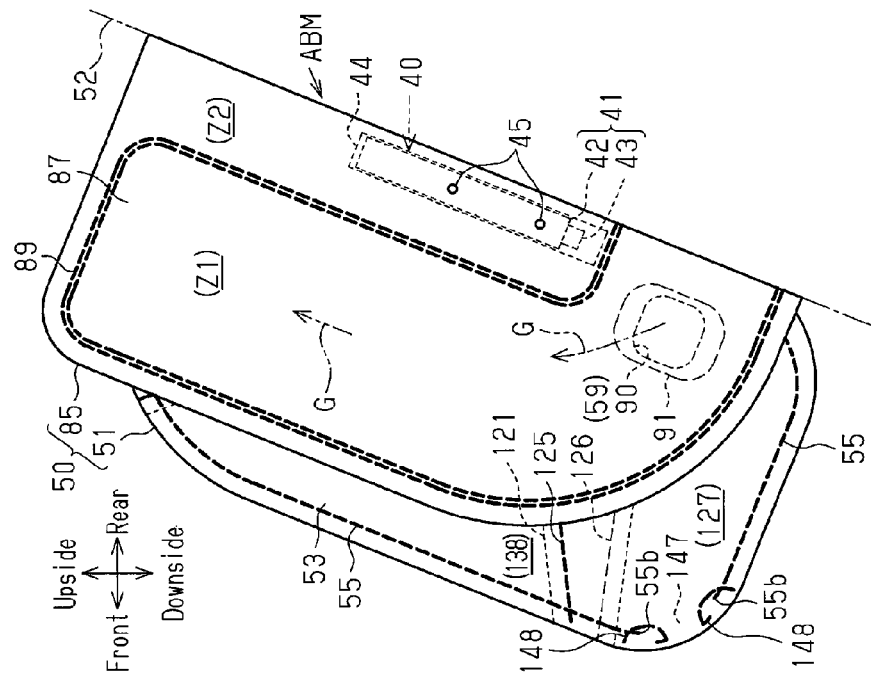
FIG. 22 is a side view of a side airbag apparatus according to a third embodiment as viewed from the outer side of the vehicle, illustrating an airbag module with an airbag in an uninflated-spread state.
Figure 24:
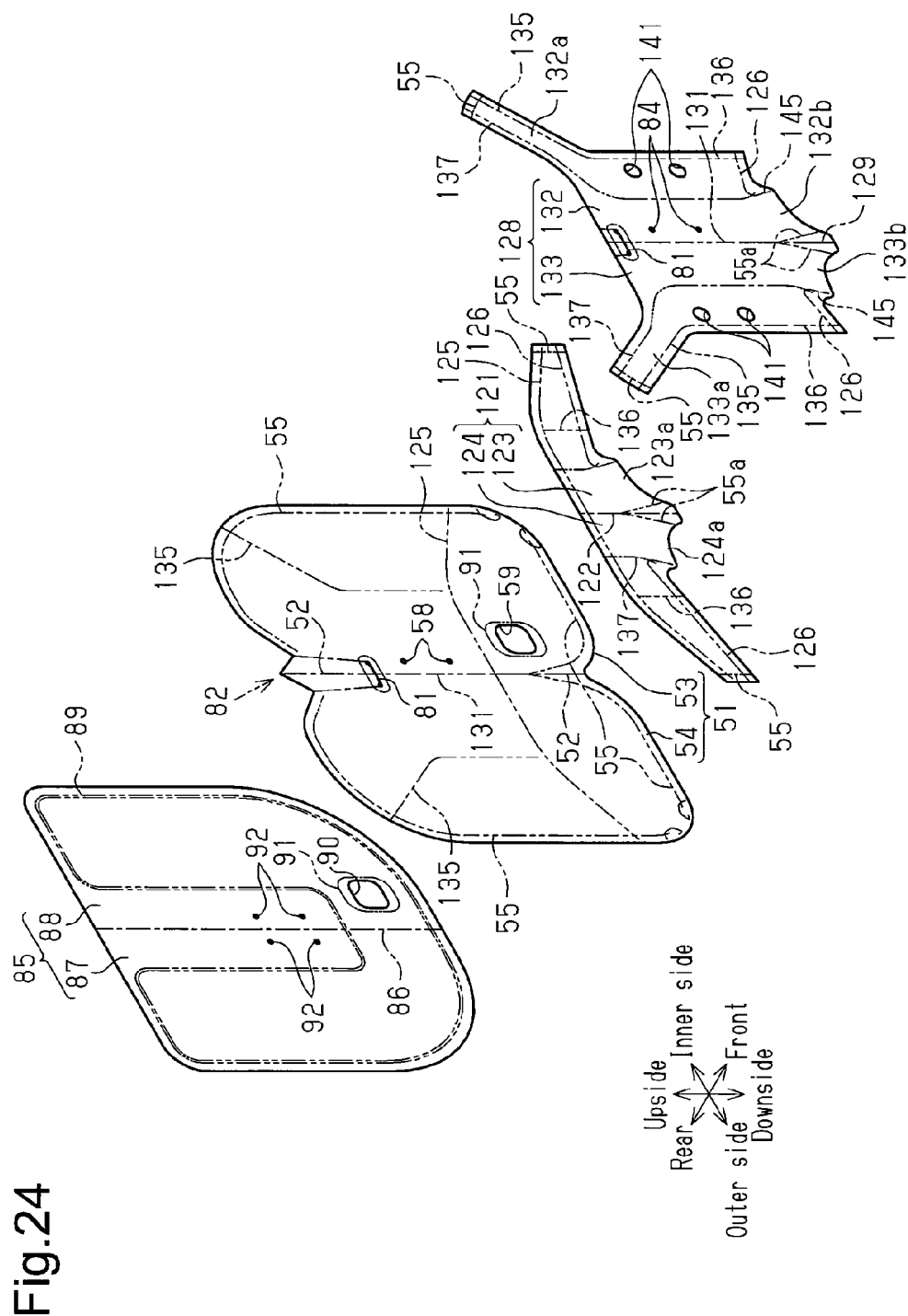
FIG. 24 is an exploded perspective view showing a flatly spread state of the components of the airbag according to the third embodiment.
Figure 25:
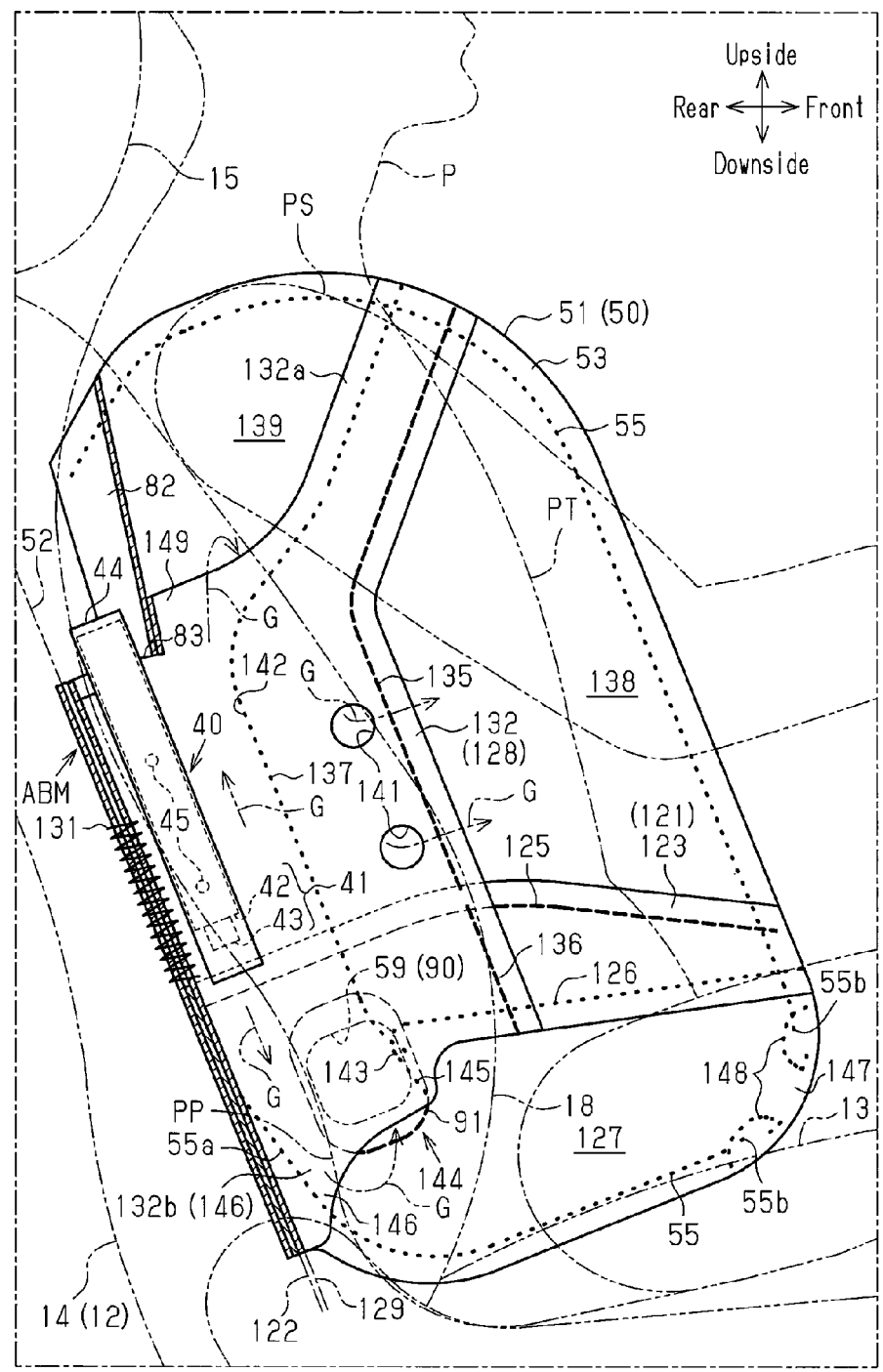
FIG. 25 is a cross-sectional side view illustrating, together with an occupant and a vehicle seat, the internal structure of the main inflation portion of the airbag module shown in FIG. 22.

As shown in FIGS. 22, 24, and 25, the main inflation portion 51 has a lateral partition 121 and a vertical partition 128. As in the first embodiment, the peripheral joint portion 55 does not have the partition joint portion 101.

<Lateral Partition 121>

The lateral partition 121 is formed by a single laterally elongated fabric piece that is made of the same material as the main inflation portion 51. The fabric piece has a vertically extending folding line 122 at the center in the vehicle width direction. The fabric piece is folded in half along the folding line 122 to be superposed on itself in the vehicle width direction. To distinguish the two superposed parts of the lateral partition 121, the part located on the inner side will be referred to as a fabric portion 123, and the part located on the outer side will be referred to as a fabric portion 124. The lateral partition 121 may also be formed of two fabric pieces divided along the folding line 122.

The fabric portions 123, 124, which are superposed on each other in the vehicle width direction, have, at the rear ends, extensions 123a, 124a extending substantially downward, respectively. The lateral partition 121, which is folded in half, is located between the fabric portions 53 and 54 of the main inflation portion 51 with the folding line 122 matched with the folding line 52 of the main inflation portion 51. The fabric portions 123, 124 are joined to the corresponding fabric portions 53, 54 of the main inflation portion 51 by the upper lateral joint portion 125, which extends substantially in the front-rear direction along the upper edges of the fabric portions 123, 124. That is, the fabric portion 123 is joined to the fabric portion 53, and the fabric portion 124 is joined to the fabric portion 54 (see FIG. 26B).

The fabric portions 123, 124, which are superposed on each other in the vehicle width direction, are joined to each other by the lower lateral joint portion 126, which extends substantially in the front-rear direction along the lower edges of the fabric portions 123, 124 (see FIG. 26B). Further, the front ends of the fabric portions 123, 124, which are superposed on each other in the vehicle width direction, are joined to the front lower parts of the fabric portions 53, 54 by part of the peripheral joint portion 55. The lateral partition 121 bridges the lower parts of the fabric portions 53, 54 of the main inflation portion 51 by the above described joining structure.

The part of the main inflation portion 51 below the lateral partition 121 forms the lower inflation chamber 127, which is deployed and inflated beside the lumbar region PP, which is part of the upper body of the occupant P. The part above the lateral partition 121 forms an upper inflation chamber.

<Vertical Partition 128>

The vertical partition 128 is formed by a single fabric piece that is made of the same material as the main inflation portion 51. The fabric piece has a vertically extending folding line 129 at the center in the vehicle width direction. The fabric piece is folded in half along the folding line 129 to be superposed on itself in the vehicle width direction. To distinguish the two superposed parts of the vertical partition 128, the part located on the inner side will be referred to as a fabric portion 132, and the part located on the outer side will be referred to as a fabric portion 133.

The vertical partition 128 is located between the fabric portions 53 and 54 of the main inflation portion 51 and between the fabric portions 123 and 124 of the lateral partition 121 with the folding line 129 matched with the folding line 52 of the main inflation portion 51 and the folding line 122 of the lateral partition 121. The vertical partition 128 is joined to the main inflation portion 51 by the vertical joint portion 131, which is provided along the folding lines 52, 129 (see FIG. 26A). This determines the position of the vertical partition 128 in relation to the main inflation portion 51.

The front upper parts of the fabric portions 132, 133, which are superposed on each other in the vehicle width direction, are formed by inclined portions 132a, 133a, which are inclined forward. The front upper ends of the inclined portions 132a, 133a are joined to the front upper ends of the fabric portions 53, 54 by part of the peripheral joint portion 55. The lower parts of the fabric portions 132, 133 are superposed on the fabric portions 123, 124 of the lateral partition 121. The lower ends of the fabric portions 132, 133 are joined to the fabric portions 123, 124 by the lower lateral joint portion 126.

In the part where the fabric portions 132, 133 are not superposed on the fabric portions 123, 124, the fabric portions 132, 133 are joined to the corresponding fabric portions 53, 54 of the main inflation portion 51 by the front vertical joint portion 135, which extends substantially vertically along the front periphery (see FIG. 26A). In the part where the fabric portions 132, 133 are superposed on the fabric portions 123, 124, the fabric portions 132, 133 are joined only to the fabric portions 123, 124 by the front vertical joint portion 136, which is located below the front vertical joint portion 135 (see FIG. 26C).

The fabric portions 132, 133 are joined to each other by the rear vertical joint portion 137 located at a position spaced apart rearward from the front vertical joint portions 135, 136. The rear vertical joint portion 137 is located at the middle part in the front rear direction in a section of the fabric portions 132, 133 that is not the inclined portions 132a, 133a. A section of the rear vertical joint portion 137 that is located at the middle part of the fabric portions 132, 133 in the front-rear direction extends vertically. In the inclined portions 132a, 133a, the rear vertical joint portion 137 is inclined along the rear edges of the inclined portions 132a, 133a.

The part of the upper inflation chamber that is located in front of the vertical partition 128 forms an upper-front inflation chamber 138, which is deployed and inflated beside the front half of the thorax region PT in the upper body of the occupant P by the inflation gas G. Part of the upper inflation chamber that is rearward of the vertical partition 128 forms an upper-rear inflation chamber 139. The upper-rear inflation chamber 139 is deployed and inflated mainly beside the rear half of the thorax region PT and the shoulder region PS in the upper body of the occupant P by the inflation gas G. The upper-rear inflation chamber 139 and the upper-front inflation chamber 138 are adjacent to and aligned with each other in the front-rear direction with the vertical partition 128 in between.

The fabric portions 132, 133 have openings 141 in the regions surrounded by the front vertical joint portions 135, 136, the rear vertical joint portion 137, the peripheral joint portion 55, and the lower lateral joint portion 126. The openings 141 connect the upper-rear inflation chamber 139 and the upper-front inflation chamber 138 to each other. In the present embodiment, the fabric portions 132, 133 have holes that form the openings 141.

In the fabric portions 132, 133 (except for the inclined portions 132a, 133a), which are superposed on each other in the vehicle width direction, the region between the folding line 129 and the rear vertical joint portion 137 constitutes an inner tube 142, which regulates the flow of the inflation gas G discharged from the gas outlet 43. The inner tube 142 has a vertically extending tubular shape with an upper open end and a lower open end. The inner tube 142 is located in the rear part of the upper-rear inflation chamber 139 and surrounds the retainer 44 of the gas generator 40. The upper open part of the inner tube 142 constitutes a gas supply port 149 for supplying some of the inflation gas G discharged from the inflator 41 to the part of the upper-rear inflation chamber 139 outside the inner tube 142.

The main inflation portion 51 and the vertical partition 128 (the inner tube 142) each have a slit 81 at the rear end. As shown in FIGS. 22 and 25, an inward folding portion 82 is formed in part above the slits 81 to form an insertion port 83. A pair of vertically arranged bolt insertion holes 58 is formed in the fabric portion 53 on the inner side at positions below the slit 81 (the insertion port 83). Also, a pair of vertically arranged bolt insertion holes 84 is formed in the fabric portion 132 on the inner side at positions below the slit 81 (the insertion port 83).

Most of the gas generator 40 except for the upper end is inserted into the rear end of the upper-rear inflation chamber 139 and the rear end of the vertical partition 128 (the inner tube 142) through the insertion port 83. The upper end of the gas generator 40 is exposed to the outside of the main inflation portion 51. The bolts 45 of the gas generator 40 are inserted into the bolt insertion holes 84, 58, so that the gas generator 40 is secured to and positioned relative to the vertical partition 128 (the inner tube 142) and the main inflation portion 51 (see FIG. 26A). Most of the gas generator 40 (including the gas outlet 43) except for the upper end is surrounded by the inner tube 142.

The fabric portions 132, 133, which are superposed on each other in the vehicle width direction, have, at the rear lower parts, extensions 132b, 133b extending substantially downward, respectively. The extensions 132b, 133b substantially have the same shapes as the extensions 123a, 124a of the lateral partition 121, which are described above.

The lateral partition 121 and the vertical partition 128 (the inner tube 142) have a communication portion 143 and a check valve 144. The communication portion 143 is adapted to connect the lower inflation chamber 127 and the upper-rear inflation chamber 139 to each other. The lower lateral joint portion 126 in the lateral partition 121 and the vertical partition 128 is disjoined in some sections in the lateral partition 121 and the vertical partition 128. More specifically, the lower lateral joint portion 126 in the lateral partition 121 and the vertical partition 128 is disjoined at the boundaries with the extensions 123a, 124a, 132b, 133b. In other words, the lower lateral joint portion 126, which joins the fabric portions 123, 124, 132, 133 together, is absent in areas including the folding lines 122, 129. In this manner, the communication portion 143 is formed by disjoined parts where the lower lateral joint portion 126 is absent.

The check valve 144 regulates the flow of the inflation gas G through the communication portion 143. That is, the check valve 144 allows the inflation gas G to flow from the upper-rear inflation chamber 139 to the lower inflation chamber 127, but restricts the flow in the opposite direction, or the flow of the inflation gas G from the lower inflation chamber 127 to the upper-rear inflation chamber 139.

The front edges of the extensions 123a, 124a of the lateral partition 121, which are superposed on each other in the vehicle width direction, and the front edges of the extensions 132b, 133b of the vertical partition 128, which are superposed on each other in the vehicle width direction, are joined to each other by the front inclined joint portion 145. The upper end of the front inclined joint portion 145 is connected to the rear end of the lower lateral joint portion 126.

The rear parts of the extensions 123a, 124a and the rear parts of the extensions 132b, 133b are joined to the lower parts of the rear ends of the fabric portions 53, 54 of the main inflation portion 51 by the rear inclined joint portion 55a, which is part of the peripheral joint portion 55. The front inclined joint portion 145 and the rear inclined joint portion 55a are both inclined rearward.

Parts of the extensions 123a, 124a, 132b, 133b that are surrounded by the front inclined joint portion 145 and the rear inclined joint portion 55a form valve members 146 of the check valve 144.

The check valve 144 allows the inflation gas G to flow when one of the valve members 146 is separated from the other. This state of the check valve 144 is referred to as a valve open state. The check valve 144 restricts flow of the inflation gas G when the valve members 146 contact each other in at least parts thereof. This state of the check valve 144 is referred to as a valve closed state.

Figure 23:
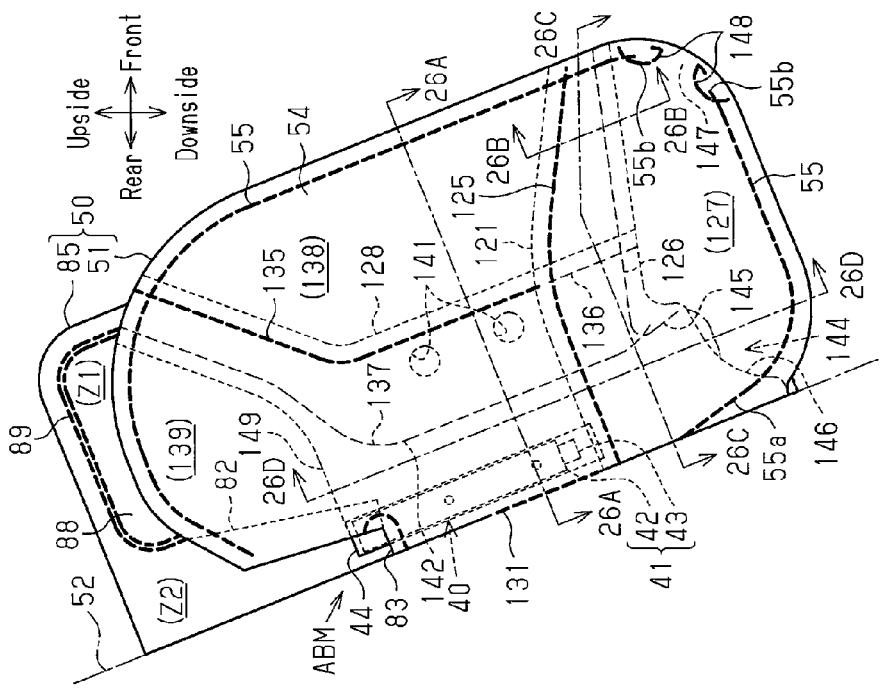
FIG. 23 is a side view illustrating the airbag module according to the third embodiment, as viewed from the inner side of the vehicle, with the airbag in an uninflated-spread state.

As shown in FIGS. 22 and 23, the lower inflation chamber 127 has a vent hole 147 for venting the inflation gas G.

The peripheral joint portion 55 has two terminal portions 55b, which are separated from each other by disjoining the fabric portions 53, 54 at the front lower part of the lower inflation chamber 127. The lower inflation chamber 127 has two surrounding joint portions 148, which join the fabric portions 53, 54 to each other while surrounding the terminal portions 55b. Part between the fabric portions 53, 54 and between the surrounding joint portions 148 does not function to join the peripheries of the fabric portions 53, 54 to each other. This part forms the vent hole 147, which connects the interior and the exterior of the lower inflation chamber 127 to each other to discharge the inflation gas G in the lower inflation chamber 127 to the outside.

The auxiliary inflation portion 85 has the same shape and size as those in the second embodiment.

As shown in FIGS. 23 to 24, the lower inflation chamber 127 of the main inflation portion 51 and the inflation region Z1 of the auxiliary inflation portion 85 respectively have communication ports 59, 90 at positions that are in the vicinity of the gas outlet 43 of the inflator 41 and in which the inflation region Z1 is superposed on the main inflation portion 51. Specifically, the communication ports 59, 90 are located in the rear lower part of the inflation region Z1. As shown in FIGS. 26C and 26D, the main inflation portion 51 and the auxiliary inflation portion 85 are connected to each other by the communication ports 59, 90. The communication ports 59, 90 have a common opening areas. The common opening area means that the opening areas are equal to or substantially equal to each other.

In the third embodiment also, the inflator 41 is arranged such that the gas outlet 43, which is located below the main body 42, is located at a position where the auxiliary inflation portion 85 and the main inflation portion 51 are superposed on each other and between the communication ports 59, 90 and the main body 42, so that the gas outlet 43 is located close to the communication ports 59, 90. The gas outlet 43 is located at a position in the upper-rear inflation chamber 139 on the boundary with the lower inflation chamber 127. Such arrangement of the inflator 41 constitutes an inflation promoting structure, which promotes inflation of the auxiliary inflation portion 85 with the inflation gas compared to inflation of the main inflation portion 51.

The main inflation portion 51 and the auxiliary inflation portion 85 are joined to each by only the loop-shaped joint portion 91 about the communication ports 59, 90 (see FIGS. 26C and 26D).

Each of the fabric portions 87, 88 has two vertically spaced bolt insertion holes 92 in an area above the communication port 90 in the non-inflation region Z2. The bolts 45 of the inflator 41, which are passed through the bolt insertion holes 84, 58 of the vertical partition 128 and the main inflation portion 51, are received by the bolt insertion holes 92 of the fabric portions 87, 88 of the auxiliary inflation portion 85. The bolts 45 are inserted into the side frame portion 23 from the outer side. Nuts 46 are threaded to the bolts 45 to fix the gas generator 40 to the side frame portion 23 together with the upper-rear inflation chamber 139 of the main inflation portion 51, the vertical partition 128 (the inner tube 142), and the non-inflation region Z2 of the auxiliary inflation portion 85.

Other than the above described differences, the third embodiment is the same as the second embodiment. Thus, like or the same reference numerals are given to those components that are like or the same as the corresponding components described above in the second embodiment and detailed explanations are omitted.

Operation and advantages of the side airbag apparatus according to the third embodiment, which is configured as described above, will now be described.

The controller 96 outputs an activation signal in response to a side collision or the like to cause the inflator 41 to discharge the inflation gas G from the gas outlet 43. As shown in FIG. 25, the inner tube 142 regulates and divides the flow of the inflation gas G into an upward stream and a downward stream. A greater amount of the inflation gas G discharged from the gas outlet 43 flows downward than upward as in the case of the second embodiment.

The upward stream of the inflation gas G is supplied to the part in the upper-rear inflation chamber 139 that is outside the inner tube 142 from the gas supply port 149 at the upper end of the inner tube 142. The inflation gas G increases the internal pressure of the upper-rear inflation chamber 139, so that the upper-rear inflation chamber 139 starts being inflated.

The downward stream of the inflation gas G is conducted to the check valve 144. During the period in which the inflation gas G is being supplied to the check valve 144, a force that deforms the valve members 146 into a tubular shape is generated. This force opens the check valve 144. Thus, the inflation gas G passes between the valve members 146 and flows into the lower inflation chamber 127. The inflation gas G increases the internal pressure of the lower inflation chamber 127, so that the lower inflation chamber 127 starts being inflated.

The continuous supply of the inflation gas G from the gas generator 40 continues to increase the internal pressures of the upper-rear inflation chamber 139 and the lower inflation chamber 127. Since the lower inflation chamber 127 receives a greater amount of the inflation gas G than the upper-rear inflation chamber 139, the internal pressure of the lower inflation chamber 127 becomes higher than that of the upper-rear inflation chamber 139. The inflation of the upper-rear inflation chamber 139 and the lower inflation chamber 127 strains the vertical partition 128 and the lateral partition 121 in the vehicle width direction.

As the inflation of the upper-rear inflation chamber 139 progresses, some of the inflation gas G in the upper-rear inflation chamber 139 flows into the upper-front inflation chamber 138 via the opening 141, so that the upper-front inflation chamber 138 starts inflating with a delay from the upper-rear inflation chamber 139.

The lower inflation chamber 127, the upper-rear inflation chamber 139, and the upper-front inflation chamber 138 are inflated while being unfolded in the reverse order of that when these were folded. The main inflation portion 51, which is deployed and inflated in the above described manner, pushes the seat pad 30 of the seat back 14, so that the seat pad 30 is broken at the breakable portion 35 (see FIG. 12). The main inflation portion 51 is projected forward from the seat back 14 through the broken portion with part of the main inflation portion 51 remaining in the storage portion 32.

In contrast, some of the inflation gas G that has flowed into the lower inflation chamber 127 through between the valve members 146 of the check valve 144 flows into the inflation region Z1 in the auxiliary inflation portion 85 after flowing through the communication port 59 of the lower inflation chamber 127 and the communication port 90 of the auxiliary inflation portion 85 in the order (see FIGS. 26C and 26D). As shown in FIG. 23, the inflation gas G flows upward in the inflation region Z1. This flow of the inflation gas G causes the inflation region Z1 of the auxiliary inflation portion 85 to start being inflated in the seat back 14 at a position in front of the pressure receiving plate 28 toward the vicinity of the boundary between the middle section 16 and the outer side section 18.

At the inflation of the auxiliary inflation portion 85, the side frame portion 23 functions as a pressure receiving portion to generate reaction force, which inflates the auxiliary inflation portion 85 toward the inner side and diagonally forward. The inflated auxiliary inflation portion 85 pushes part of the outer side section 18 close to the middle section 16 so that the part bulges toward the inner side and diagonally forward.

As described above, the inflation gas G supplied from the inflator 41 causes the main inflation portion 51 and the auxiliary inflation portion 85 to start being inflated in the order. In the third embodiment also, the inflation of the auxiliary inflation portion 85 is promoted compared to the inflation of the main inflation portion 51 as discussed in the advantage (1') of the second embodiment. This is because the gas outlet 43 of the inflator 41 is located below the main body 42 and at a position in the upper-rear inflation chamber 139 on the boundary with the lower inflation chamber 127.

Since the inflation of the auxiliary inflation portion 85 is promoted compared to the inflation of the main inflation portion 51, the seat pad 30 bulges toward the inner side and diagonally forward to push the back of the occupant P leaning against the seat back 14 toward the inner side and diagonally forward before the main inflation portion 51 is deployed forward outside the seat back 14. The occupant P is moved toward the inner side as indicated by the long dashed double-short dashed lines in FIG. 2. This enlarges the space between the side wall 11 and the occupant P in the vehicle width direction.

In contrast, the main inflation portion 51, which has projected forward from the seat back 14, continues being inflating thereafter. That is, the main inflation portion 51 is deployed and inflated forward in the space between the side wall 11 and the upper body of the occupant P.

As shown in FIG. 25, among the lower inflation chamber 127, the upper-front inflation chamber 138, and the upper-rear inflation chamber 139, the lower inflation chamber 127, the internal pressure of which is the highest, is deployed and inflated beside the lumbar region PP, which has the highest impact resistance in the side of the upper body of the occupant P. The upper-rear inflation chamber 139, the internal pressure of which is the second highest to the lower inflation chamber 127, is deployed and inflated beside the rear half of the thorax region PT and the shoulder region PS, which has a higher impact resistance than the front half of the thorax region PT. The upper-front inflation chamber 138, the internal pressure of which is lower than the upper-rear inflation chamber 139, is deployed and inflated beside the front half of the thorax region PT, which has a lower impact resistance than the shoulder region PS and the rear half of the thorax region PT.

At this time, as described above, the space between the side wall 11 and the occupant P is enlarged in the vehicle width direction as the auxiliary inflation portion 85 moves the occupant P. Thus, compared to a case in which the auxiliary inflation portion 85 does not enlarge the space in this manner, the main inflation portion 51 is easily deployed and inflated between the occupant P and the side wall 11, which is bulging into the passenger compartment.

The upper body of the occupant P (the lumbar region PP, the shoulder region PS, and the thorax region PT) is pushed and restrained by the lower inflation chamber 127, the upper-rear inflation chamber 139, and the upper-front inflation chamber 138 with a pressure distribution appropriate for the respective impact resistances. As a result, the impact from the side, which is transmitted via the side wall 11, is mitigated by the lower inflation chamber 127, the upper-rear inflation chamber 139, and the upper-front inflation chamber 138, so that the lumbar region PP, the shoulder region PS, and the thorax region PT are protected.

In a configuration in which the upper inflation chamber is constituted by a single cell, the upper inflation chamber is deployed and inflated forward all at once with momentum. In contrast, in the third embodiment, the upper inflation chamber is deployed and inflated forward in two steps in the order of the upper-rear inflation chamber 139 and the upper-front inflation chamber 138. Thus, even if an obstacle exists in front of the main inflation portion 51, the obstacle will not be thrust by the main inflation portion 51 as the main inflation portion 51 is deployed.

When the discharge of the inflation gas G from the inflator 41 stops and the inflation gas G in the lower inflation chamber 127 acts to flow to the upper-rear inflation portion 139, the valve members 146 of the check valve 144 are pushed by the high pressure in the lower inflation chamber 127 and contact each other. The check valve 144 is thus closed and restricts the inflation gas G in the lower inflation chamber 127 from flowing out to the upper-rear inflation chamber 139 through between the valve members 146. Therefore, the internal pressure of the lower inflation chamber 127, which has been increased to a level adequate for protecting the lumbar region PP of the occupant P, or an internal pressure higher than that of the upper-rear inflation chamber 139, is restrained from being lowered due to outflow of the inflation gas G.

Surplus inflation gas G in the lower inflation chamber 127 is discharged to the outside through the vent hole 147. In this manner, when the occupant P is restrained by the main inflation portion 51, the internal pressure of the lower inflation chamber 127 is lowered, so that the lumbar region PP of the occupant P is pushed with an adequate pressing force.

The above embodiments may be modified as follows.

<Regarding Inflator 41>

The inflator 41 of the second embodiment may be arranged at a position spaced apart upward from a position in the upper inflation chamber 103 on the boundary with the lower inflation chamber 102 as long as the gas outlet 43 is located below the main body 42 and at a position where the auxiliary inflation portion 85 and the main inflation portion 51 are superposed on each other. Likewise, the inflator 41 of the third embodiment may be arranged at a position spaced apart upward from a position in the upper-rear inflation chamber 139 on the boundary with the lower inflation chamber 127 as long as the gas outlet 43 is located below the main body 42 and at a position where the auxiliary inflation portion 85 and the main inflation portion 51 are superposed on each other.

In this case also, the gas outlet 43 is located close to the communication ports 59, 79, 90 of the second embodiment or close to the communication ports 59, 90 of the third embodiment, so that some of the inflation gas G discharged from the gas outlet 43 quickly reaches the lower inflation chambers 102, 127. This improves the performance of the lower inflation chambers 102, 127 for restraining the lumbar region PP at an early stage. Also, some of the inflation gas G discharged from the gas outlet 43 quickly reaches the auxiliary inflation portion 85 through the communication ports 59, 79, 90 of the second embodiment or through the communication ports 59, 90 of the third embodiment. This promotes the inflation of the auxiliary inflation portion 85 compared to the inflation of the main inflation portion 51.

<Regarding Main Inflation Portion 51>

The main inflation portion 51 of the first embodiment may be divided into three or more chambers arranged in the front-rear direction by two or more partitions 60. In this case, each partition 60 has openings 66 for connecting the inflation chambers on the opposite sides of the partition 60. The inflator 41 is arranged in the rearmost one of the inflation chambers. The communication ports 59, 79, 90 are provided in the rearmost inflation chamber, the inner tube 70, and the auxiliary inflation portion 85, respectively.

The common opening area of the communication ports 59, 79, 90 may be set to be greater than the total opening area of the openings 66 of the rearmost partition 60 to constitute an inflation promoting structure.

The inner tubes 70, 142 of the first and third embodiments may be modified as long as these arranged to surround at least the gas outlet 43 of the inflator 41. Thus, unlike the first and third embodiments, in which most of the inflator 41 is surrounded by the inner tube 70, 142, only the gas outlet 43 may be surrounded by the inner tube 70, 142.

The main inflation portion 51 of the second and third embodiments may be divided into three or more chambers arranged in the vertical direction. More specifically, an additional inflation chamber may be provided above the upper inflation chamber 103 of the second embodiment. Alternatively, an additional inflation chamber may be provided above one of the upper-rear inflation chamber 139 and the upper-front inflation chamber 138 of the third embodiment.

The upper inflation chamber of the third embodiment may be divided into three or more chambers arranged in the front-rear direction.

The part of the upper body of the occupant P to be restrained and protected by the main inflation portion 51 may be different from that in the above illustrated embodiments.

<Regarding Auxiliary Inflation Portion 85>

Unlike the above illustrated embodiments, the auxiliary inflation portion 85 in an uninflated-spread state may be entirely arranged to be superposed on the main inflation portion 51 in an uninflated-spread state. In this case also, to obtain the inflation promoting structure, the inflator 41 is preferably arranged such that the gas outlet 43 is located at a position where the auxiliary inflation portion 85 and the main inflation portion 51 are superposed on each other and is located between the communication ports 59, 79, 90 and the main body 42.

In each of the illustrated embodiments, the auxiliary inflation portion 85 may be folded like the main inflation portion 51 when arranged in the storage portion 32.

<Regarding Check Valve 111 of Second Embodiment>

The check valve 111 may be formed by superposing two independent valve members 113, 114 on each other in the vehicle width direction and joining these into a tubular shape. In this case, the rear ends of the superposed valve members 113, 114 are joined to each other at the joint portion extending along the rear edges.

The rigid portion 116 may be formed by a material other than sewing threads, for example, an elongated plate made of synthetic plastic or metal.

<Regarding Vertical Partition 128 of Third Embodiment>

Unlike the third embodiment, in which the inner tube 142 is formed by part of the vertical partition 128, the inner tube 142 and the vertical partition 128 may be constituted by different members.

In this case, the vertical partition 128 may include a pressure regulator valve that adjusts the opening degree of the opening 141 to regulate the internal pressures of the upper-rear inflation chamber 139 and the upper-front inflation chamber 138.

The pressure regulator valve may restrict the flow of the inflation gas G from the upper-rear inflation chamber 139 to the upper-front inflation chamber 138 either prior to restraint of the occupant P with the upper-rear inflation chamber 139 or at an early stage of supply of the inflation gas G to the upper-rear inflation chamber 139. Further, the pressure regulator valve may cancel the restriction of the flow in response to the external force applied due to the restraint of the occupant P by the upper-rear inflation chamber 139 or an increase in the internal pressure of the upper-rear inflation chamber 139.

The vertical partition 128 may have a shape different from that in the third embodiment. In this case, the shape of the vertical partition 128 is preferably changed in accordance with the location of the upper body of the occupant P to be restrained and protected by the upper-rear inflation chamber 139. For example, the inclined portions 132a, 133a may extend vertically without being tilted.

<Other Modifications>

At least one of the partition 60 and the inner tube 70 of the side airbag apparatus of the first embodiment may be omitted.

Vehicles to which the side airbag apparatus according to the present invention is applied include various industrial vehicles in addition to private cars.

The invention claimed is:

1. A side airbag apparatus comprising:
an airbag, which is configured to be stored in an outer side section of a seat back of a vehicle seat; and
an inflator, which supplies inflation gas to the airbag, wherein
the airbag includes
a main inflation portion, which is configured to be inflated with the inflation gas supplied from the inflator, project from the seat back, and be deployed forward in a space between a side wall of a vehicle and an occupant seated in a normal posture in the vehicle seat, and
an auxiliary inflation portion having a smaller volume than that of the main inflation portion, wherein the auxiliary inflation portion is configured to be inflated in the seat back with the inflation gas from the inflator, thereby pushing the occupant toward an inner side of the vehicle prior to the inflation of the main inflation portion outside the seat back,
the main inflation portion and the auxiliary inflation portion each have a communication port that connects the main inflation portion and the auxiliary inflation portion to each other,
the inflator is arranged in the main inflation portion,
the airbag includes an inflation promoting structure, which promotes inflation of the auxiliary inflation portion compared to inflation of the main inflation portion,
the auxiliary inflation portion is arranged to be at least partly superposed on the main inflation portion,
the communication port of the main inflation portion and the communication port of the auxiliary inflation portion are formed at a position where the main inflation portion and the auxiliary inflation portion are superposed on each other,
the inflator includes an elongated main body and a gas outlet, which is provided at one end of the main body and discharges inflation gas,
the inflation promoting structure is constituted by arranging the inflator such that the gas outlet is located at the position where the auxiliary inflation portion and the main inflation portion are superposed on each other and between the main body and the communication ports of the main inflation portion and the auxiliary inflation portion,
the main inflation portion includes a plurality of inflation chambers defined to be arranged in a vertical direction,
a lowermost one of the inflation chambers is a lower inflation chamber,
a main part of the lower inflation chamber is deployed and inflated at a position directly above a seat cushion of the vehicle seat,
the auxiliary inflation portion is arranged to be superposed on both of the lower inflation chamber and an upper inflation chamber, which is one of the inflation chambers that is adjacent to and above the lower inflation chamber,
the communication port of the main inflation portion is formed in the lower inflation chamber,
the communication port of the auxiliary inflation portion is formed in part of the auxiliary inflation portion that is superposed on the lower inflation chamber,
the inflator is arranged such that the gas outlet is located below the main body, and
the inflator is arranged such that the gas outlet is located at a position in the upper inflation chamber on a boundary with the lower inflation chamber.

2. The side airbag apparatus according to claim 1, wherein the airbag includes an inner tube, which is arranged in the main inflation portion to surround at least the gas outlet of the inflator and includes a communication port,
the main inflation portion, the auxiliary inflation portion, and the inner tube are connected to one another via the communication ports thereof,
the inner tube includes a gas supply port for supplying the inflation gas from the inflator to the main inflation portion, and
the inflation promoting structure is configured such that the communication ports are located at a position where a distance from the gas outlet to the communication ports is shorter than a distance from the gas outlet to the gas supply port.

3. The side airbag apparatus according to claim 1, wherein an upper part of the auxiliary inflation portion is inflated in an upper part in the seat back.

4. The side airbag apparatus according to claim 1, wherein
a seat frame, which forms a framework of the seat back, is arranged in the seat back,
the auxiliary inflation portion includes a non-inflation region, which is neither supplied with inflation gas nor inflated, in addition to an inflation region, which is inflated with inflation gas,
the auxiliary inflation portion is fixed to the seat frame at the non-inflation region,
the communication port of the auxiliary inflation portion is located in the inflation region, and
the main inflation portion and the auxiliary inflation portion are joined to each other by only a loop-shaped joint portion provided about the communication ports of the main inflation portion and the auxiliary inflation portion.

5. The side airbag apparatus according to claim 1, wherein the auxiliary inflation portion is stored in the seat back in a spread state.

6. A side airbag apparatus comprising:
an airbag, which is configured to be stored in an outer side section of a seat back of a vehicle seat; and
an inflator, which supplies inflation gas to the airbag, wherein
the airbag includes
  a main inflation portion, which is configured to be inflated with the inflation gas supplied from the inflator, project from the seat back, and be deployed forward in a space between a side wall of a vehicle and an occupant seated in a normal posture in the vehicle seat, and
  an auxiliary inflation portion having a smaller volume than that of the main inflation portion, wherein the auxiliary inflation portion is configured to be inflated in the seat back with the inflation gas from the inflator, thereby pushing the occupant toward an inner side of the vehicle prior to the inflation of the main inflation portion outside the seat back,
the main inflation portion and the auxiliary inflation portion each have a communication port that connects the main inflation portion and the auxiliary inflation portion to each other,
the inflator is arranged in the main inflation portion,
the airbag includes an inflation promoting structure, which promotes inflation of the auxiliary inflation portion compared to inflation of the main inflation portion,
the auxiliary inflation portion is arranged to be at least partly superposed on the main inflation portion,
the communication port of the main inflation portion and the communication port of the auxiliary inflation portion are formed at a position where the main inflation portion and the auxiliary inflation portion are superposed on each other,
the inflator includes an elongated main body and a gas outlet, which is provided at one end of the main body and discharges inflation gas,
the inflation promoting structure is constituted by arranging the inflator such that the gas outlet is located at the position where the auxiliary inflation portion and the main inflation portion are superposed on each other and between the main body and the communication ports of the main inflation portion and the auxiliary inflation portion, the main inflation portion includes a plurality of inflation chambers defined to be arranged in a vertical direction,
a lowermost one of the inflation chambers is a lower inflation chamber,
a main part of the lower inflation chamber is deployed and inflated at a position directly above a seat cushion of the vehicle seat,
the auxiliary inflation portion is arranged to be superposed on both of the lower inflation chamber and an upper inflation chamber, which is one of the inflation chambers that is adjacent to and above the lower inflation chamber,
the communication port of the main inflation portion is formed in the lower inflation chamber,
the communication port of the auxiliary inflation portion is formed in part of the auxiliary inflation portion that is superposed on the lower inflation chamber,
the inflator is arranged such that the gas outlet is located below the main body, and
the main inflation portion includes a check valve that restricts inflation gas from flowing from the lower inflation chamber to the upper inflation chamber.

7. A side airbag apparatus comprising:
an airbag, which is configured to be stored in an outer side section of a seat back of a vehicle seat; and
an inflator, which supplies inflation gas to the airbag, wherein
the airbag includes
  a main inflation portion, which is configured to be inflated with the inflation gas supplied from the inflator, project from the seat back, and be deployed forward in a space between a side wall of a vehicle and an occupant seated in a normal posture in the vehicle seat, and
  an auxiliary inflation portion having a smaller volume than that of the main inflation portion, wherein the auxiliary inflation portion is configured to be inflated in the seat back with the inflation gas from the inflator, thereby pushing the occupant toward an inner side of the vehicle prior to the inflation of the main inflation portion outside the seat back,
the main inflation portion and the auxiliary inflation portion each have a communication port that connects the main inflation portion and the auxiliary inflation portion to each other,
the inflator is arranged in the main inflation portion,
the airbag includes an inflation promoting structure, which promotes inflation of the auxiliary inflation portion compared to inflation of the main inflation portion,
the auxiliary inflation portion is arranged to be at least partly superposed on the main inflation portion,
the communication port of the main inflation portion and the communication port of the auxiliary inflation portion are formed at a position where the main inflation portion and the auxiliary inflation portion are superposed on each other,
the inflator includes an elongated main body and a gas outlet, which is provided at one end of the main body and discharges inflation gas,
the inflation promoting structure is constituted by arranging the inflator such that the gas outlet is located at the position where the auxiliary inflation portion and the main inflation portion are superposed on each other and between the main body and the communication ports of the main inflation portion and the auxiliary inflation portion, the main inflation portion includes a plurality of inflation chambers defined to be arranged in a vertical direction, a lowermost one of the inflation chambers is a lower inflation chamber, a main part of the lower inflation chamber is deployed and inflated at a position directly above a seat cushion of the vehicle seat, the auxiliary inflation portion is arranged to be superposed on both of the lower inflation chamber and an upper inflation chamber, which is one of the inflation chambers that is adjacent to and above the lower inflation chamber, the communication port of the main inflation portion is formed in the lower inflation chamber, the communication port of the auxiliary inflation portion is formed in part of the auxiliary inflation portion that is superposed on the lower inflation chamber, the inflator is arranged such that the gas outlet is located below the main body, the upper inflation chamber includes a vertical partition, which includes an opening and divides the upper inflation chamber at least into an upper-rear inflation chamber and an upper-front inflation chamber in front of the upper-rear inflation chamber, the inflator is arranged in the upper-rear inflation chamber, inflation gas that has been discharged from the gas outlet and has passed through the opening of the vertical partition flows into the upper-front inflation chamber, the upper-rear inflation chamber includes an inner tube, which is arranged to surround at least the gas outlet of the inflator, and the inner tube includes a gas supply port, which is provided at an upper end of the inner tube and supplies inflation gas from the inflator to the upper-rear inflation chamber.

* * * * *